United States Patent
Lan et al.

(10) Patent No.: US 12,519,615 B2
(45) Date of Patent: Jan. 6, 2026

(54) ADVANCED ENCRYPTION STANDARD (AES) DEVICE

(71) Applicant: AGENCY FOR SCIENCE, TECHNOLOGY AND RESEARCH, Singapore (SG)

(72) Inventors: Jingjing Lan, Singapore (SG); Anh Tuan Do, Singapore (SG); Vishnu Paramasivam, Singapore (SG)

(73) Assignee: Agency for Science, Technology and Research, Singapore (SG)

(*) Notice: Subject to any disclaimer, the term of this patent is extended or adjusted under 35 U.S.C. 154(b) by 153 days.

(21) Appl. No.: 18/262,144

(22) PCT Filed: Jan. 26, 2021

(86) PCT No.: PCT/SG2021/050036
§ 371 (c)(1),
(2) Date: Jul. 19, 2023

(87) PCT Pub. No.: WO2022/164381
PCT Pub. Date: Aug. 4, 2022

(65) Prior Publication Data
US 2024/0305446 A1    Sep. 12, 2024

(51) Int. Cl.
*H04L 9/00* (2022.01)
*H04L 9/06* (2006.01)

(52) U.S. Cl.
CPC .................. *H04L 9/0631* (2013.01)

(58) Field of Classification Search
CPC ............ H04L 9/0631; G06F 21/602; H03K 19/17768
See application file for complete search history.

(56) References Cited

U.S. PATENT DOCUMENTS

| | | | |
|---|---|---|---|
| 2008/0019504 A1* | 1/2008 | Han | H04L 9/0631 380/28 |
| 2019/0213119 A1 | 7/2019 | Yang et al. | |
| 2020/0328877 A1* | 10/2020 | Muthineni | G06F 1/329 |

FOREIGN PATENT DOCUMENTS

| | | |
|---|---|---|
| CN | 109633422 | 8/2021 |
| WO | 2022/164381 A1 | 8/2022 |

OTHER PUBLICATIONS

Balli, Fatih, Andrea Caforio, and Subhadeep Banik. "The area-latency symbiosis: towards improved serial encryption circuits." IACR Transactions on Cryptographic Hardware and Embedded Systems (2020): 239-278. https://tches.iacr.org/index.php/TCHES/article/view/8734 (Year: 2020).*

(Continued)

*Primary Examiner* — Syed M Ahsan
(74) *Attorney, Agent, or Firm* — Kilpatrick Townsend & Stockton LLP

(57) ABSTRACT

An Advanced Encryption Standard (AES) device and a computer-implemented method of performing an AES operation may be provided, the AES device comprising a state array of components comprising a first plurality of controllable data processing components, the first plurality of controllable data processing components including two or more controllable data processing state members that each include an additional input control and an additional input port; a key array of components comprising a second plurality of controllable data processing components; a control block module coupled to the state array of components and the key array of components, the control block module arranged to transmit one or more control signals to the state array of components and the key array of components; wherein the two or more controllable data processing state members are disposed at predetermined positions within the state array of components; and further wherein (Continued)

the control block module is arranged to instruct performance of one or more AES operations via usage of the additional input port of at least one of the two or more controllable data processing state members based on a clock cycle count.

14 Claims, 26 Drawing Sheets

(56) References Cited

OTHER PUBLICATIONS

Balli, Fatih, Andrea Caforio, and Subhadeep Banik. "The area-latency symbiosis: towards improved serial encryption circuits." IACR Transactions on Cryptographic Hardware and Embedded Systems (2021): 239-278. (Year: 2021).*
Balli et al., "The Area-Latency Symbiosis: Towards Improved Serial Encryption Circuits," IACR Transactions on Cryptographic Hardware and Embedded Systems, ISSN 2569-2925, vol. 2021, No. 1, pp. 239-278, DOI: 10.46586/tches.v2021.il.239-278.
Banik et al., "Compact Circuits for Combined AES Encryption / Decryption," Journal of Cryptographic Engineering, 9(1), 69-83, 2019, DOI: 10.1007/s13389-017-0176-3.
International Search Report and Written Opinion for PCT/SG2021/050036 dated Apr. 23, 2021, all pages.

* cited by examiner

| Cycle | Counter Value | Cycle | Counter Value |
|---|---|---|---|
| 0 | 00000 | 11 | 00111 |
| 1 | 00001 | 12 | 01110 |
| 2 | 00010 | 13 | 11101 |
| 3 | 00101 | 14 | 11011 |
| 4 | 01010 | 15 | 10111 |
| 5 | 10101 | 16 | 01111 |
| 6 | 01011 | 17 | 11110 |
| 7 | 10110 | 18 | 11100 |
| 8 | 01100 | 19 | 11000 |
| 9 | 11001 | 20 | 10000 |
| 10 | 10011 | | |

ADVANCED ENCRYPTION STANDARD (AES) DEVICE

CROSS-REFERENCE TO RELATED APPLICATIONS

This application is a 371 National Stage filing of PCT Application No. PCT/SG2021/050036, filed Jan. 26, 2021, which is incorporated by reference herein in its entirety.

TECHNICAL FIELD

The present disclosure relates broadly to an Advanced Encryption Standard (AES) device and to a method of performing an AES operation.

BACKGROUND

The Advanced Encryption Standard (AES) is a specification for encryption of data that has been established since the year 2001. Typically, it is described as a block cipher algorithm and is typically used for symmetric encryption. The AES has become a widely-used cryptographic algorithm for security services in several applications.

Due to the increasing use of devices that utilize communications such as Internet-of-Things (IoT) devices and mobile devices such as mobile phones, there is also a corresponding increasing demand for areas such as media content protection, memory encryption and network security. It is recognized that the AES may be developed for implementation on such devices and such applications.

It is also recognized that as such devices that utilize communications are desired to be miniaturized, the resources available for implementing the AES may become increasingly constrained. It is recognized that silicon area utilization and energy efficiency may be primary and key design constraints for AES hardware directed at implementation on the above-mentioned devices.

Hence, there exists a need for an AES device and a method of performing an AES operation that seek to address at least one of the above issues.

SUMMARY

In accordance with an aspect of the present disclosure, there is provided an Advanced Encryption Standard (AES) device, the AES device comprising a state array of components comprising a first plurality of controllable data processing components, the first plurality of controllable data processing components including two or more controllable data processing state members that each include an additional input control and an additional input port; a key array of components comprising a second plurality of controllable data processing components; a control block module coupled to the state array of components and the key array of components, the control block module arranged to transmit one or more control signals to the state array of components and the key array of components; wherein the two or more controllable data processing state members are disposed at predetermined positions within the state array of components; and further wherein the control block module is arranged to instruct performance of one or more AES operations via usage of the additional input port of at least one of the two or more controllable data processing state members based on a clock cycle count.

The AES device may further comprise the second plurality of controllable data processing components including two or more controllable data processing key members that each include an additional input control and an additional input port; wherein the two or more controllable data processing key members are disposed at predetermined positions within the key array of components; and further wherein the control block module is arranged to instruct the performance of the one or more AES operations via usage of the additional input port of at least one of the two or more controllable data processing key members based on the clock cycle count.

The AES device may further comprise the control block module being arranged to instruct the performance of the one or more AES operations based on a distribution over a plurality of predetermined clock cycles.

The AES device may further comprise the control block module being arranged to transmit the one or more control signals to the state array of components to hold one or more data movement within the state array of components.

The control block module may comprise a state counter, the state counter being based on a predetermined number of clock cycles to indicate completion of a round of an AES procedure; and a data output component, the data output component arranged to output a round constant value based on an indication of a commencement of a round.

The AES device may further comprise a functional block module, the functional block module being coupled to the state array of components and the key array of components, the functional block module also coupled to the control block module; and wherein the functional block module comprises a single substitution box (S-Box) of predetermined values, the single S-Box being accessible to both the state array of components and the key array of components.

The functional block module may further comprise one or more parallel processing members that is each arranged to obtain as an input a plurality of inputs simultaneously in the form of a column from the state array of components, the one or more parallel processing members being further arranged to process the plurality of inputs and to output a MixColumns value that is indicative of a row value for the state array of components.

The functional block module may further comprise a shared circuitry that is accessible to the state array of components and the key array of components, the shared circuitry being arranged to output a round key to the key array of components or an input data to the state array of components.

For an AES-128 procedure, the state array of components may be ordered in a 4×4 array and the controllable data processing state members may be disposed at least in the first, fourth, fifth, eighth, ninth, twelfth and thirteenth positions of the 4×4 array; further wherein the first position is the bottom-right-most position of the array and the array having each position being serially coupled to a next position.

The performance of the one or more AES operations may be distributed over three different predetermined clock cycles.

In accordance with another aspect of the present disclosure, there is provided a computer-implemented method of performing an AES operation, the method comprising accessing a state array of components comprising a first plurality of controllable data processing components, the first plurality of controllable data processing components including two or more controllable data processing state members that each include an additional input control and an additional input port, wherein the two or more controllable data processing state members are disposed at predetermined positions within the state array of components;

accessing a key array of components comprising a second plurality of controllable data processing components; accessing a control block module coupled to the state array of components and the key array of components, the control block module arranged to transmit one or more control signals to the state array of components and the key array of components; instructing performance of one or more AES operations using the control block module by using the additional input port of at least one of the two or more controllable data processing state members and by basing on a clock cycle count.

The method may further comprise accessing the second plurality of controllable data processing components including two or more controllable data processing key members that each include an additional input control and an additional input port, wherein the two or more controllable data processing key members are disposed at predetermined positions within the key array of components; and instructing performance of the one or more AES operations using the control block module by using the additional input port of at least one of the two or more controllable data processing key members and by basing on the clock cycle count.

The step of instructing performance of the one or more AES operations using the control block module may further comprise instructing performance of the one or more AES operations by basing on a distribution over a plurality of predetermined clock cycles.

The step of instructing performance of the one or more AES operations using the control block module may further comprise transmitting the one or more control signals to the state array of components to hold one or more data movement within the state array of components.

The method may further comprise accessing a state counter, the state counter being based on a predetermined number of clock cycles to indicate completion of a round of an AES procedure; and using the control block module to instruct a data output component to output a round constant value based on an indication of a commencement of a round.

The method may further comprise accessing a functional block module, the functional block module being coupled to the state array of components and the key array of components, the functional block module also coupled to the control block module; and wherein the functional block module comprises a single substitution box (S-Box) of predetermined values, the single S-Box being accessible to both the state array of components and the key array of components.

The functional block module may further comprise one or more parallel processing members that is each arranged to obtain as an input a plurality of inputs simultaneously in the form of a column from the state array of components, and the method may further comprise using the control block module to instruct the one or more parallel processing members to process the plurality of inputs and to output a MixColumns value that is indicative of a row value for the state array of components.

The functional block module may further comprise a shared circuitry that is accessible to the state array of components and the key array of components, and the method may further comprise using the control block module to instruct the shared circuitry to output a round key to the key array of components or an input data to the state array of components.

For an AES-128 procedure, the state array of components may be ordered in a 4×4 array and the controllable data processing state members may be disposed at least in the first, fourth, fifth, eighth, ninth, twelfth and thirteenth positions of the 4×4 array; further wherein the first position is the bottom-right-most position of the array and the array having each position being serially coupled to a next position.

The step of instructing performance of the one or more AES operations using the control block module may further comprise instructing performance of the one or more AES operations distributed over three different predetermined clock cycles.

BRIEF DESCRIPTION OF THE DRAWINGS

Exemplary embodiments of the present disclosure will be better understood and readily apparent to one of ordinary skill in the art from the following written description, by way of example only, and in conjunction with the drawings, in which:

FIG. 4E is a table showing state counter values for different clock cycles in the exemplary embodiment.

DETAILED DESCRIPTION

Figure 1:
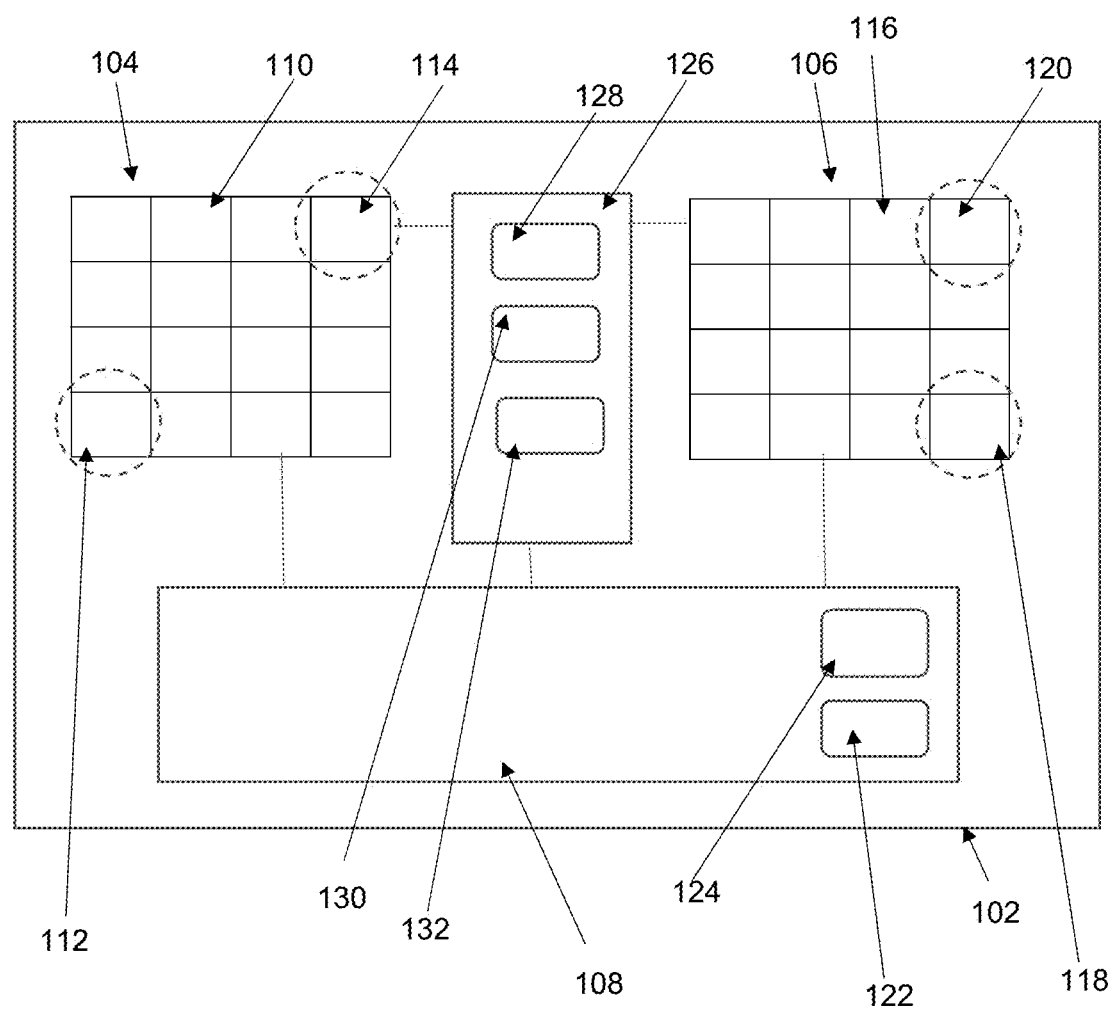
FIG. 1 is a schematic block diagram illustrating an AES device in an exemplary embodiment.

The exemplary embodiments described herein may provide an Advanced Encryption Standard (AES) device. The AES device may be an AES hardware accelerator. The AES device may also be a relatively compact and low-power device that is suitable for edge computing.

Prior to describing the exemplary embodiments of the present disclosure, it may be useful to recall the general steps and/or concepts used in AES procedures as follows. AES generally operates with a fixed block size of 128 bits, and a key size of 128, 192, or 256 bits. AES is based on a design principle generally known as a substitution-permutation network. AES generally operates on, illustratively, a 4×4 array or matrix of bytes, termed the state.

The key size used for an AES cipher specifies the number of transformation rounds that convert an input, generally known as the plaintext, into a final output, generally known as the ciphertext. In general, 10 rounds of processing are performed for 128-bit keys for AES-128; 12 rounds of processing are performed for 192-bit keys for AES-192; and 14 rounds of processing are performed for 256-bit keys for AES-256. In general, one of the rounds of processing typically depends on the encryption key itself.

In the rounds of processing, one or more processing steps are taken. For example, round keys are derived from the cipher key using round constants $rcon_i$. As an example, for AES-128, AES uses up to $rcon_{10}$ (as 10 round keys are typically needed).

After initialising a state array with block data (from the plaintext), an initial round key is added to the starting state array (typically, this is known as AddRoundKey where each byte of the state is combined with a byte of the round key e.g. using bitwise xor). Thereafter, different transformations or AES operations are typically performed to the state array and these operations include SubBytes, ShiftRows, MixColumns and AddRoundKey.

In brief, SubBytes is a non-linear substitution step where each byte is replaced with another according to a lookup table such as a substitution box or S-Box. ShiftRows is a transposition step where the last three rows of the state (illustratively a 4×4 matrix) are shifted cyclically a certain number of steps. For example, each byte of the second row is shifted one to the left, and the third and fourth rows are shifted by offsets of two and three respectively. As such, each column of the output state of the ShiftRows step has bytes from each column of the input state. MixColumns is a linear mixing step which operates on the columns of the state, combining the four bytes in each column. For example, each column is transformed using a fixed matrix (e.g. matrix multiplication) whereby four bytes are taken as input and four bytes are outputted. It is appreciated that each input byte typically affects all four output bytes. Typically, AddRoundKey is performed again after MixColumns whereby the existing state array may be processed (e.g. through an XOR operation) with the value of the appropriate round key, and the state array is replaced with the result.

Regarding the key schedule in AES, a key may be provided in 32-bit words: e.g. 4 words for AES-128, 6 words for AES-192, and 8 words for AES-256. In general, $K_0$, $K_1$, .... $K_{N-1}$ may represent the 32-bit words of the original key. For key expansion, other AES operations may be performed. For example, RotWord is a one byte circular shift of a word and SubWord is usage of a substitution box or S-Box to each of the bytes of the word.

In the exemplary embodiments described herein, the AES operations performed on the state (or state array) and/or the key (or key array) such as SubBytes, ShiftRows, MixColumns, AddRoundKey, RotWord etc. are termed as operations while an AES encryption is termed generally as an AES procedure. For example, for AES-128, there may be 10 rounds of the AES procedure.

FIG. 1 is a schematic block diagram illustrating an AES device in an exemplary embodiment.

The AES device 102 comprises a state array 104 of components and a key array 106 of components. The AES device 102 further comprises a control block module 108 coupled to the state array 104 of components and the key array 106 of components. In the exemplary embodiment, at least the state array 104 comprises a first plurality of controllable data processing components e.g. 110 that also includes two or more controllable data processing state members e.g. 112, 114 that each include an additional input control and an additional input port.

For ease of description, the controllable data processing components that have more input for control and an additional input port are identified as "members". In the exemplary embodiment, the two or more controllable data processing state members e.g. 112, 114 are disposed at predetermined positions within the state array 104 of components. In the exemplary embodiment, the controllable data processing components e.g. 110 and the controllable data processing state members e.g. 112, 114 function to process data directly within the state array 104. In some exemplary embodiments, each controllable data processing component e.g. 110 may be controlled using a clock input and may function as a data latch. In some exemplary embodiments, each controllable data processing state member e.g. 112, 114 may be controlled using a clock input and an additional trigger input at its additional input control. That is, there may be two input control for such a member. In the exemplary embodiments, each controllable data processing state member e.g. 112, 114 may receive another input at its additional input port e.g. when a trigger signal is received at its additional input control. For example, the additional trigger input may be a scan-enable signal that may itself be based on another clock input. For example, the additional input control may be a scan-enable input port or control path.

To conduct AES operations and/or procedures, the control block module 108 transmits one or more control signals to the state array 104 of components and the key array 106 of components. The control block module 108 is able to instruct performance of one or more AES operations, such as but not limited to ShiftRows and MixColumns, via usage of the additional input port of at least one of the two or more controllable data processing state members e.g. 112, 114 based on a clock cycle count. For example, based on a predetermined cycle number, the control block module 108 is able to additionally control at least one of the two or more controllable data processing state members e.g. 112, 114 for dataflow.

In the exemplary embodiment, the key array 106 of components comprises a second plurality of controllable data processing components e.g. 116. In some exemplary embodiments, the second plurality of controllable data processing components e.g. 116 may additionally include two or more controllable data processing key members that each include an additional input control and an additional input port, similar to the presence of the controllable data processing state members e.g. 112, 114 of the state array 104. For ease of illustration, the two or more controllable data processing key members for such exemplary embodiments are exemplarily indicated at numerals 118, 120. In such examples, the two or more controllable data processing key members e.g. 118, 120 are disposed at predetermined positions within the key array of components and the control block module 108 is able to instruct the performance of the one or more AES operations, such as but not limited to the generation of round keys and RotWord, via usage of the additional input port of at least one of the two or more controllable data processing key members based on the clock cycle count. For example, based on a predetermined cycle number, the control block module 108 is able to additionally control at least one of the two or more controllable data processing key members e.g. 118, 120 for dataflow.

In the exemplary embodiment, due to the predetermined placement of the controllable data processing state members e.g. 112, 114 and/or the controllable data processing key members e.g. 118, 120, as well as the respective additional input port of such members, the control block module 108 is able to instruct the performance of the one or more AES operations. For example, an AES operation may be performed based on a distribution over a plurality of predetermined clock cycles. In other words, in such examples, an AES operation may be performed to completion over two or more clock cycles.

For example, the control block module 108 is able to transmit the one or more control signals to the state array 104 of components to hold one or more data movement within the state array 104 of components. For example, a predetermined/selected number of state components or state members may be instructed to hold data movement while data movement is allowed with the remaining state components or state members. For example, the dataflow may be via the at least one of the two or more controllable data processing state members e.g. 112, 114 being controlled for dataflow. For example, such one or more control signals may be a signal to perform clock gating.

In some exemplary embodiments, the control block module 108 may comprise a state counter 122. The state counter 122 functions to determine the completion of processing of one set of data within the state array. For example, the set of data may be indicated as processed when a previous state data is processed and the current state data is loaded within the state array. Further, the value of the state counter 122 indicates the status of the state array and key array in each round. For example, with reference to a ShiftRows operation to be commenced in clock cycle 7, the state counter value in clock cycle 7 can indicate that the current clock cycle count (i.e. clock cycle 7) in each round of processing. Thus, when the state counter 122 comprises the specific value indicating clock cycle 7, the AES device e.g. the control block module can determine that the current clock cycle in the current round is cycle 7. For example, the state counter 122 may indicate completion of one round of an AES procedure based on a predetermined number of clock cycles. For example, the state counter 122 may be a 21-clock cycle counter and may therefore indicate completion of each round in 21 clock cycles. The control block module 108 may also comprise a data output component 124. The data output component 124 is arranged to output at least a round constant value based on an indication of a commencement of a round. In some exemplary implementations, the indication of a commencement of a round may be provided by the state counter 122. In some examples, the data output component 124 may be in, but not limited to, the form of a linear-feedback shift register.

In some exemplary embodiments, the AES device 102 may further comprise a functional block module 126. In such embodiments, the functional block module 126 is coupled to the state array 104 of components and the key array 106 of components, the functional block module 126 also coupled to the control block module 108. The functional block module 126 comprises a single substitution box (S-Box) 128 of predetermined values and allows the single S-Box 128 to be accessible to both the state array 104 of components and the key array 106 of components. For example, one or more AES operations instructed by the control block module 108 to the state array 104 and/or the key array 106 may make use of the single S-Box 128 for transformations/processing. As an example, the S-Box may be formed using combinational logic only, i.e. without utilising storage, and therefore, minimising the use of chip area. As another example, the S-Box may be stored in a data storage component disposed within the functional block module 126. Such data storage component may include, but is not limited to, a memory component, a register bank with a look-up table etc.

In some exemplary embodiments, the functional block module 126 may further comprise one or more parallel processing members e.g. 130 that is each arranged to obtain as an input a plurality of inputs simultaneously in the form of a column from the state array 104 of components. The one or more parallel processing members e.g. 130 may then process the plurality of inputs and output a MixColumns value for substitution within the state array 104 of components, e.g. as a row value of the state array 104.

In some exemplary embodiments, the functional block module 126 may further comprise a shared circuitry 132 that is accessible to the state array 104 of components and the key array 106 of components. For example, the control block module 108 may instruct usage of the shared circuitry 132 to output a round key to the key array 106 of components. For example, the control block module 108 may instruct usage of the shared circuitry 132 to provide an input data to the state array 104 of components.

In the exemplary embodiment, the control block module 108 may comprise or be coupled to or be in the form of a processing module/unit or computer processor, e.g. a microcontroller unit or a central processing unit, to implement the one or more AES operations of the AES device 102.

Figure 2:
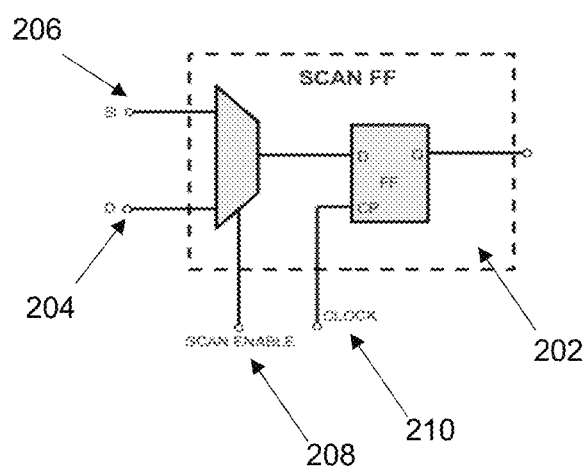
FIG. 2 is a schematic illustration of a possible controllable data processing member in an exemplary embodiment.

FIG. 2 is a schematic illustration of a possible controllable data processing member in an exemplary embodiment. The data processing member may be implemented as a controllable data processing state member (compare state members e.g. 112, 114 of FIG. 1) and/or a controllable data processing key member (compare key members e.g. e.g. 118, 120 of FIG. 1).

In the present disclosure, the inventors recognise that a number of multiplexer functions for a selection from two inputs to one output are beneficial for arriving at the various exemplary embodiments. Such functions may implement AES operations such as ShiftRows, MixColumns shift-in control, RotWord and round keys generation. While the inventors recognise that a D flip-flop and a 2-to-1 multiplexer (MUX) may be used for such functions, the inventors further recognise that usage of a scan flip-flop to replace the arrangement of D flip-flop and a 2-to-1 MUX can be even more beneficial.

As shown in FIG. 2, the scan flip-flop 202 comprises a functional input D 204 and another or second/additional input 206 serving as the Scan-In (SI) input 206. A Scan/Test Enable port 208 (SE/TE) is usable to receive a control signal to control the MUX selection between input D 204 and SI input 206. A clock input 210 is provided for performing the typical D flip-flop operations or for performing data latch/transmission operations.

With the implementation as shown in FIG. 2 for input signal control, the inventors recognise that a savings of about 18% savings in terms of area may be achieved.

Figure 3A:
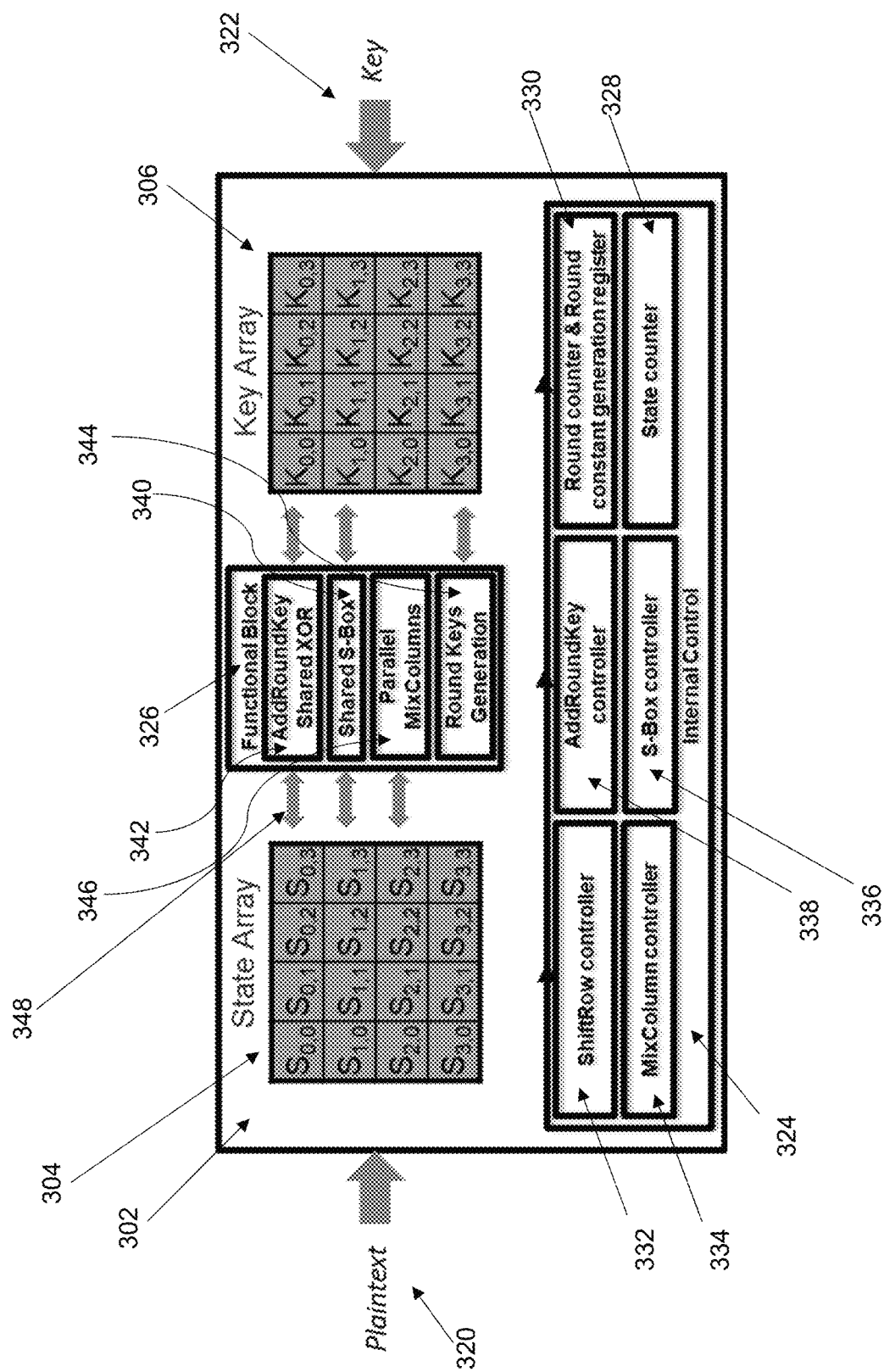
FIG. 3A is a schematic block diagram of an AES device in another exemplary embodiment.

FIG. 3A is a schematic block diagram of an AES device in another exemplary embodiment. The AES device 302 may be termed an AES hardware accelerator. The AES device 302 functions substantially similarly to the AES device 102 of FIG. 1. As will be understood with the specific details described below, the AES device 102 of FIG. 1 is broader and more general in scope than the AES device 302.

The AES device 302 comprises a state array block 304 and a key array block 306. Compare the state array 104 and the key array 106 of FIG. 1. The state array block 304 is arranged to receive an input plaintext 320 and the key array block 306 is arranged to receive encryption key data 322. The state array block 304 and the key array block 306 each comprise controllable data processing members to store and shift bytes of data in one or more methods to be described in later sections, the data corresponding to the input plaintext 320 and the encryption key data 322.

In the exemplary embodiment, the AES device 302 further comprises a control block 324 and a functional block 326. Compare the control block module 108 and the functional block module 126 of FIG. 1. The control block 324 is coupled to the state array block 304, the key array block 306 and the functional block 326. The functional block 326 is coupled to the state array block 304 and the key array block 306. The control block 324 functions to provide internal control of the AES device 302 and the functional block 326 functions to provide processing members or circuitry or hardware for AES operations involving the state array block 304 and/or the key array block 306.

In the exemplary embodiment, controllable data processing components may be implemented using D flip-flops and controllable data processing members may be implemented using scan flip-flops (compare FIG. 2).

Figure 3B:
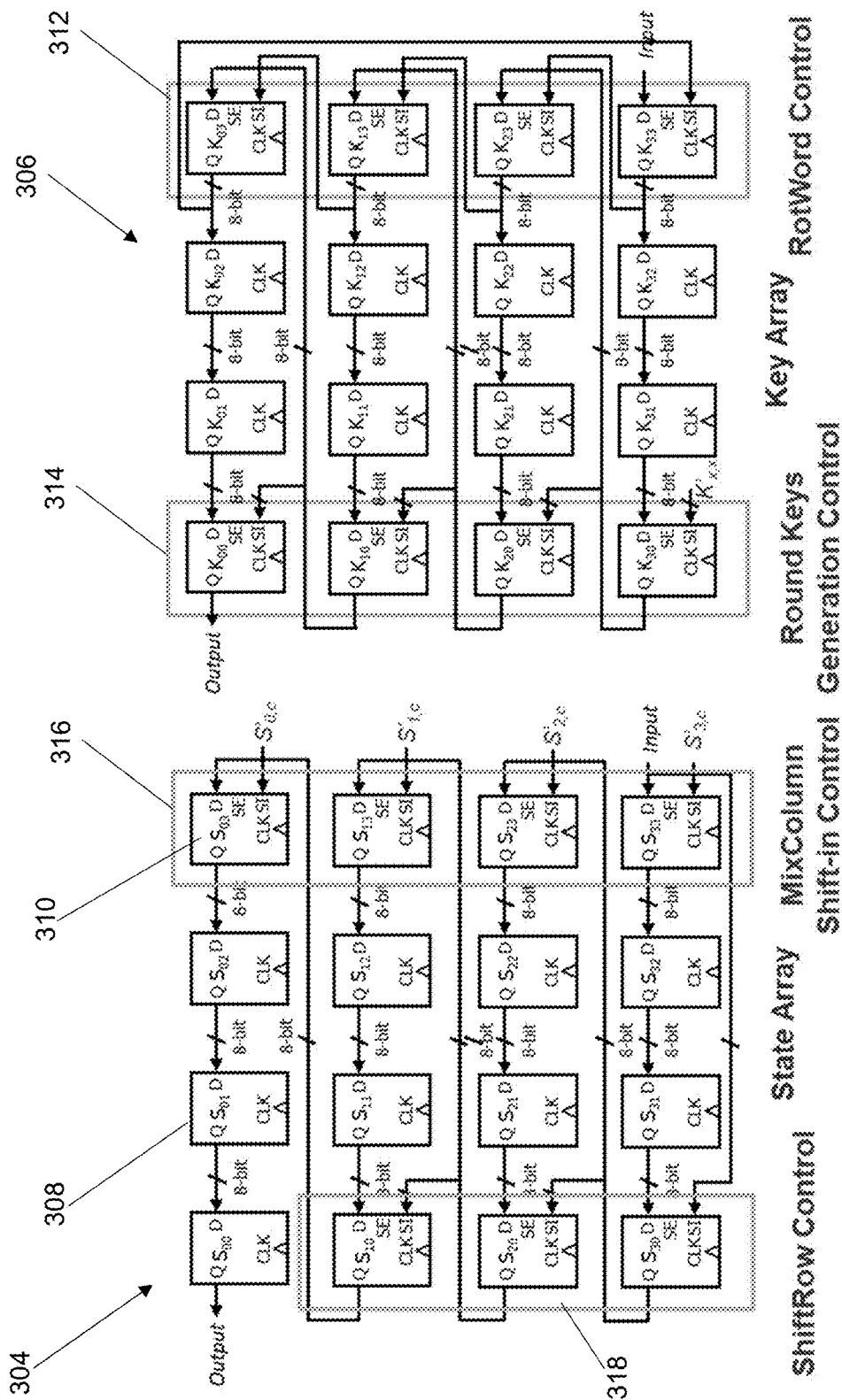
FIG. 3B is a schematic diagram for illustrating a state array block and a key array block of the exemplary embodiment.

FIG. 3B is a schematic diagram for illustrating the state array block 304 and the key array block 306.

In the exemplary embodiment, the state array block 304 and the key array block 306 each comprise an array of flip-flops including a plurality of D flip-flops e.g. 308 and a plurality of scan flip-flops e.g. 310. The scan flip-flops e.g. 310 are disposed or placed at predetermined or specific positions within the state array block 304 and the key array block 306. In more detail, the scan flip-flops are placed at the first, fourth, fifth, eighth, ninth, twelfth, thirteenth and sixteenth stages of the key array block 306 and at the first, fourth, fifth, eighth, ninth, twelfth and thirteenth stages of the state array block 304. The first stage is understood to be the bottom-right-most position of the respective array while the fourth stage is counted to the left of the first stage and the fifth stage is positioned above the first stage and so on. The positions of the scan flip-flops are illustrated at the boxes 312, 314, 316 and 318. The scan flip-flops e.g. 310 are disposed at these stages of the state array block 304 and the key array block 306 so that the scan flip-flops e.g. 310 may communicate with the control block 324 and the functional block 326.

For the state array block 304 and the key array block 306, the array of flip-flops including the plurality of D flip-flops e.g. 308 and the plurality of scan flip-flops e.g. 310 is arranged such that the flip-flops are coupled from the first stage to the last (sixteenth) stage. That is, the flip-flops are disposed as serial stages, or coupled serially. For the ease of illustration, the flip-flop at a particular stage may be referred to as the stage of the block/array. The output (or Q port) of each flip-flop at each stage is coupled to the input (or D port) of the flip-flop in the next stage, with the exception of the last stage flip-flops. For the state array block 304, the output (or Q port) of the last stage flip-flop may be connected to a processing circuit/block for an AddRoundKey operation and/or a SubBytes operation. For the key array block 306, the output (or Q port) of the last stage flip-flop may be connected to a processing circuit/block for an AddRoundKey operation and/or a round key generation operation.

Further, the scan flip-flops e.g. 310 may be disposed in a chain-based arrangement. Certain scan flip-flops e.g. 310 additionally have the output (or Q port) connected to the second/additional input (or SI input/port) of another scan flip-flop e.g. 310. The specific coupling can be observed from FIG. 3B. For the exemplary embodiment, for AES-128 and with 4×4 array/matrix arrangements for the state array and the key array, the coupling may ensure that the encryption process (i.e. processing rounds) work correctly.

In more detail, for the state array block 304, the Q port of the fourth stage is further coupled/connected to the SI port of the eighth stage and the Q port of the eighth stage is further coupled to the SI port of the twelfth stage. The SI port of the fourth stage is coupled to the first input or D port of the first stage. The arrangement for these fourth, eighth and twelfth stages of the state array block 304 is so that a ShiftRows control may be implemented. For the first, fifth, ninth and thirteenth stages of the state array block 304, the respective SI ports are coupled to the functional block 326 so that a MixColumns shift-in control may be implemented. For example, the thirteenth stage may receive a MixColumns data/output from the functional block 326 with the data corresponding to row 0; the ninth stage may receive a MixColumns data/output from the functional block 326 with the data corresponding to row 1; the fifth stage may receive a MixColumns data/output from the functional block 326 with the data corresponding to row 2; and the first stage may receive a MixColumns data/output from the functional block 326 with the data corresponding to row 3.

In more detail, for the key array block 306, the Q port of the first stage is further coupled/connected to the SI port of the fifth stage; the Q port of the fifth stage is further coupled to the SI port of the ninth stage; the Q port of the ninth stage is further coupled to the SI port of the thirteenth stage; and the Q port of the thirteenth stage is further coupled to the SI port of the first stage. In some exemplary embodiments, one of the stages of the right column, e.g. the ninth stage, may have its Q port additionally connected to an S-Box input. The arrangement for these first, fifth, ninth and thirteenth stages of the key array block 306 is so that a RotWord control may be implemented. Next, the Q port of the fourth stage is further coupled to the SI port of the eighth stage; the Q port of the eighth stage is further coupled to the SI port of the twelfth stage; and the Q port of the twelfth stage is further coupled to the SI port of the sixteenth stage. Further, the SI port of the fourth stage is coupled to the functional block 326. The arrangement for these fourth, eighth, twelfth and sixteenth stages of the key array block 306 is so that a round key generation control may be implemented.

In the exemplary embodiment, as an exemplary implementation, the state array block 304 and the key array block 306 each uses a 128-bit flip-flop array. As described, each array has sixteen stages. In the exemplary implementation, 8-bit flip-flops are disposed in each stage. Thus, in total, only 256-bit flip-flops are used to store the state and the key data during the whole encryption process. Such state and key data are processed directly within the stages of the respective arrays, within the flip-flops disposed at each stage of the respective arrays.

In the exemplary embodiment, the control block 324 functions to provide internal control of the AES device 302. The control block 324 comprises a state counter 328 and a data output component 330 that functions as a Round constant Rcon generator & Round counter module/block 330. In some examples, the data output component 330 may be in the form of a linear-feedback shift register. In addition, the control block 324 comprises a ShiftRows controller 332 and a MixColumns controller 334. Such controllers 332, 334 are provided to instruct one or more AES operations relating to the state array block 304. Further, the control block 324 comprises a S-box controller 336 and an AddRoundKey controller 338.

The control block 324 is provided to perform input data control for the functional block 326 and shift data control with the scan chain-based state array block 304 and key array block 306 in specific or predetermined clock cycles. The control block 324 may generate control signals such as scan-enable signals in selected or predetermined clock cycles to instruct performance of one or more AES operations at the state array block 304 and/or at the key array block 306. The control block 324 may synchronize the overall data flow within the AES device 302 and may control the functional block 326 and the scan-flip-flop input and output switch(es) in the array blocks 304, 306.

In the exemplary embodiment, the state counter 328 and a data output component 330 (that functions as a Round constant Rcon generator & Round counter block 330) may be comprised in a data control block of the control block 324. In some exemplary embodiments, the Round constant Rcon generator & Round counter block 330 is provided to generate a single 8-bit output that represents a round constant value and also a round value (i.e. round counting) for each round of transformation of the input plaintext 320. In some exemplary embodiments, the state counter 328 may comprise a linear-feedback shift register provided to perform state counting in each round of transformation and the Round constant Rcon generator & Round counter block 330 can comprise a shared linear-feedback shift register to provide the round constant value and the round value.

In the exemplary embodiment, the ShiftRows controller 332 comprise a ShiftRows control block. The ShiftRows control block comprises a clock generation block that in turn comprises one or more clock gating cells and a state array shift data control block. The clock generation block is provided to generate different clock inputs for the flip-flops in the state array block 304. The clock generation block may provide row-based clocking scheduling that allows data to be shifted inside the state array block 304 as desired for an AES ShiftRows operation. The one or more clock gating cells may be used to prevent/hold byte shift operations (or data movement) in specific/predetermined flip-flops/stages in the state array block 304. The shift data control block may provide a multiplexer selection combined with flip-flops in the state array block 304 (i.e. the scan flip-flops) to perform a ShiftRows operation in distributed different clock cycles. That is, the ShiftRows operation may be performed based on a distribution over a plurality of predetermined clock cycles.

In the exemplary embodiment, the functional block 326 functions to provide processing members or circuitry or hardware for AES operations involving the state array block 304 and/or the key array block 306. The AES operations are substantially instructed by the control block 324. The functional block 326 comprises a single S-Box module/block 340 to provide a single shared S-Box 340 to the state array block 304 and/or the key array block 306.

The functional block 326 further comprises a shared circuitry that is accessible to the state array block 304 and/or the key array block 306, the shared circuitry being arranged to output a round key, e.g. further using a S-Box, to the key array block 306 and to output an input data, e.g. AddRoundKey, to at least the state array block 304. In the exemplary embodiment, the shared circuitry is in the form of a shared AddRoundKey and round keys generation block that comprises an AddRoundKey circuit/block 342 (that may include one or more XOR gates) and a round keys generation circuit/block 344.

Further, the functional block 326 comprises one or more parallel processing members that is each arranged to obtain as an input a plurality of inputs simultaneously in the form of a column from the state array block 304, the one or more parallel processing members being further arranged to process the plurality of inputs and to output a MixColumns value that is indicative of a row value for the state array block 304. In the exemplary embodiment, the one or more parallel processing members are comprised in a parallel MixColumns module/block 346.

Thus, in the exemplary embodiment, there can be provided a shared S-Box module/block 340 that in turn comprises S-Box combinational logic and a S-box input data control block. The shared S-Box block 340 may be used to perform SubBytes transformation to generate input data for the state array block 304, and/or to provide S-Box input data mux control input switch(es) between an AddRoundKey output and the key array block 306 to perform SubWord transformation for the key array block 306. For the parallel MixColumns module/block 346, the MixColumns block 346 may comprise one or more XOR gates and a state array shift data control block, the MixColumns block 346 may be used to perform MixColumns for the state array block 304, and/or to provide shift data control muxes combined with flip-flops in the state array block 304 (i.e. the scan flip-flops) to shift in MixColumns results.

In the exemplary embodiment, the shared AddRoundKey and round keys generation block that comprises the AddRoundKey circuit/block 342 and the round keys generation circuit/block 344 may have the following details. The shared AddRoundKey and round keys generation block may comprise one or more XOR gates and a key array shift data control block. Such XOR gates may be used to perform round keys generation based on the shared S-Box block 340.

Such XOR gates also form a shared AddRoundKey XOR block. The shared AddRoundKey XOR gates may be used to perform AddRoundKey operations to generate input data for the state array block 304. The shared AddRoundKey and round keys generation block may also provide shift data control muxes shift data control muxes combined with flip-flops in the key array block 306 (i.e. the scan flip-flops) to shift in round keys generation results.

In FIG. 3A, the usage of components of the functional block 326 may be observed by the arrow indications e.g. 348 provided between the functional block 326 and the state array block 304 and/or the key array block 306.

In the exemplary embodiment, with the processing members or circuitry or hardware provided by the functional block 326, one or more AES operations such as SubByte and SubWord, MixColumns, AddRoundKey and round keys generation may be instructed/performed in one or more predetermined/selected/specific clock cycles and controlled/instructed by the control block 324.

In the following description, an exemplary implementation of a state counter and of a Round constant Rcon generation and Round counter are described. Compare the state counter 328 and the Round constant Rcon generator & Round counter module/block 330 of FIG. 3A.

For typical AES designs, a round counter is required to perform round counting and a round constant generation block is required to generate a round constant.

In the exemplary embodiments described with reference to FIGS. 1 and 3A, the inventors have managed to eliminate the presence of a specific round counter, i.e. there is no specific round counter in the AES devices described above.

In an exemplary embodiment, the inventors have recognised that both the round constant and the round value may be fixed in each round. The inventors have recognised that both the round constant and the round value may be updated only when a new round is commenced. Typically, it is known that the round constant rcon; for round i of the key expansion is a 32-bit word. $Rcon_i$ may be written as [$rc_i$ $00_{16}$ $00_{16}$ $00_{16}$].

Figures 4A, 4B:
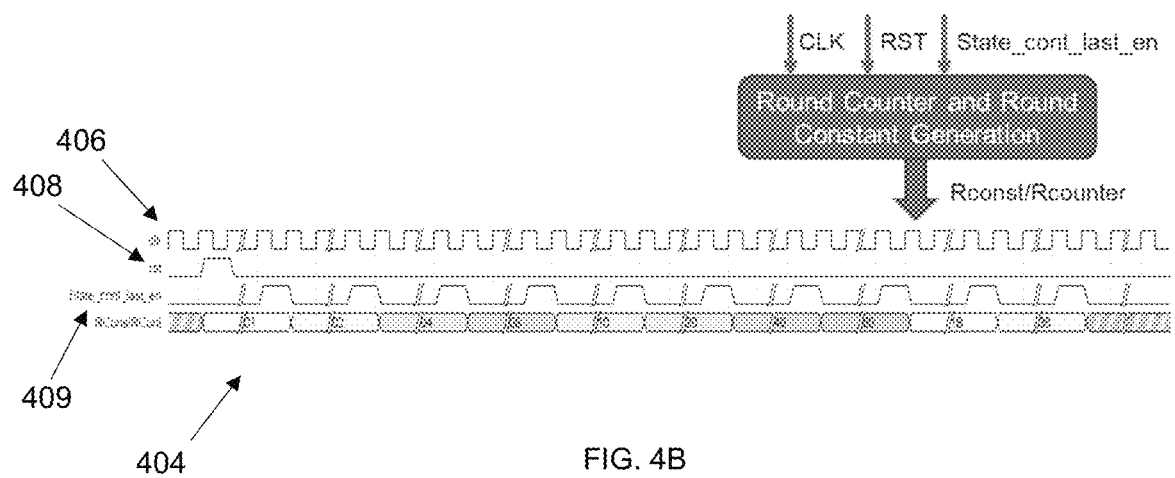
FIG. 4A is a table showing a round constant (Rcon) for each round in an exemplary embodiment.
FIG. 4B is a schematic diagram illustrating a clock schedule for implementing a loading of a round constant value and a round value in the exemplary embodiment.

FIG. 4A is a table showing the round constant (Rcon) for each round in the exemplary embodiment. In the exemplary embodiment, according to the table 402, the round constant (Rcon) value is used directly as the round counter value for each round. The $rc_i$ values in the table 402 are shown in underlined and bold, and these are the values of Rcon in hexadecimal.

FIG. 4B is a schematic diagram illustrating a clock schedule for implementing a loading of a round constant value and a round value in the exemplary embodiment. The clock schedule 404 may be used for a data output component such as a shift register to output data which in this case comprise the round constant (Rcon or Rcons) value. The data may include the round value (Rcont). As such, such a shift register may be a shared shift register to provide both the round constant value and the round value. In other words, it is possible to provide a shared round counter and a round constant generator/generation in one single hardware block, i.e. the shared shift register.

The clock schedule 404 is based on a regular clock input (clk) 406 that also affects the transformations of the data in the AES device (compare e.g. the state array block 304 and the key array block 306 of FIGS. 3A and 3B) and also utilises a reset input (rst) 408. The control of the clock input clk 406 may be by a control block module (compare control block 324 of FIG. 3A). In addition, the clock schedule 404 is based on an input "state_cont_last_en" 409 that may be transmitted from a state counter. The state counter may indicate completion of a round of an AES procedure, the indication based on a predetermined number of clock cycles. For example, referring to FIG. 4B, the rst signal and the state_cont_last_en signal are low. When it is determined that round 1 has started, the rst signal may be triggered to be high so that the round constant value of "01" is provided by the data output component. Thereafter, the rst signal may become low. At the end of each round, e.g. commencement of round 2, the state_cont_last_en signal may be triggered to be high so that the round constant value of "02" is provided by the data output component. Thereafter, the state_cont_last_en signal may become low until the next round. In the exemplary embodiment, an 8-bit linear-feedback shift register may be used to perform the round counting and to generate a round constant value for each round.

Therefore, in the exemplary embodiment, the rst signal and the state_cont_last_en signal provide an indication of a commencement of a round. In some exemplary implementations, it may be modified such that the initial rst signal may also be provided by a state counter.

In the exemplary embodiment, the control of the clock input clk 406 may be by a control block module, e.g. by the use of a clock gating cell. It will be appreciated that the clock input may be provided by other ways, for example, from an external clock source that is disposed external to the AES device. In some exemplary implementations, there may be provided a clock port or clk port on the AES device to receive such external clock input.

Figure 4C:
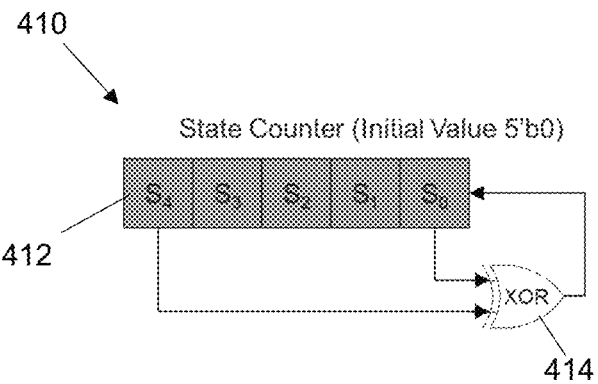
FIG. 4C is a schematic diagram illustrating a state counter in the exemplary embodiment.
Figure 4D:
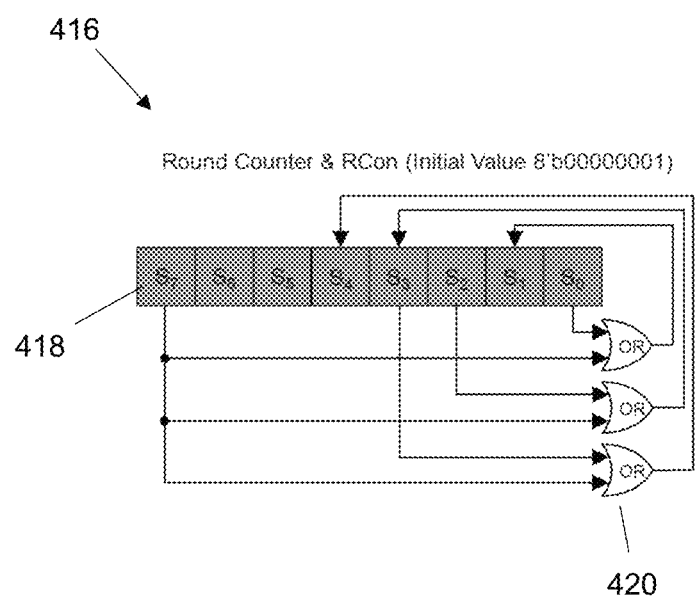
FIG. 4D is a schematic diagram illustrating a shared round counter and a round constant generator in the exemplary embodiment.

FIG. 4D is a schematic diagram illustrating a shared round counter and a round constant generator in the exemplary embodiment. The round counter and a round constant generator 416 functions as the data output component in the exemplary embodiment. Compare also the exemplary output at table 402.

The linear-feedback shift register for both round counter and round constant generation comprises 8-bit flip-flops 418 and 3-bit OR gate 420. At the flip-flops 418, an initial value may be exemplarily set as 8'b00000001. The inventors recognize that with the implementation of the round counter and a round constant generator 416, no extra/further control logic is required to generate a round constant value.

FIG. 4C is a schematic diagram illustrating a state counter in the exemplary embodiment.

The state counter 410 may be used for internal signal control and can be implemented as a compact 5-bit linear-feedback shift register. The shift register comprises 5-bit flip-flops 412 and a 1-bit XOR gate 414. At the flip-flops 412, an initial value may be exemplarily set as 5'b0. In the exemplary embodiment, the state counter 410 is configured to provide a 21 clock cycles length for each round. As such, upon counting 21 clock cycles as the predetermined number of clock cycles, it is indicated that one round has been completed. That is, it may be configured for the AES device that one round of encryption/transformation is completed in a predetermined number of clock cycles and this counting of clock cycles to indicate completion of each round may be implemented using any such counters. In the exemplary embodiment, the state counter linear-feedback shift register and XOR gate 414 output can be triggered to provide the state_cont_last_en signal for the round counter enable input state_cont_last_en 409, i.e. to trigger the output of the next round constant value and round value for the next round at the Round constant Rcon generation and Round counter.

FIG. 4E is a table showing state counter values for different clock cycles in the exemplary embodiment. In the exemplary embodiment, according to the table 422, the output of the registers S0 to S4 or flip-flops 412 may be used to trigger the enable signals used by the state array and the key array, e.g. for the controllable data processing members or scan flip-flops. For example, with reference to a ShiftRows operation to be commenced in clock cycle 7, the state counter value in clock cycle 7, in this case "10110", can indicate that the current clock cycle count (i.e. clock cycle 7) and may be used to generate both a scan enable signal SE for a scan flip-flop disposed at a predetermined position within the state array of components and a corresponding clock gating signal arranged to be output during the clock cycle 7.

With the above implementation of the state counter and the Round constant Rcon generation and Round counter, the inventors recognise that the AES device of the exemplary embodiment may have area savings. In conventional AES design, round constant generation and round counters may typically be implemented separately with different blocks but such implementation occupies more area. Otherwise, for designs using combinatorial/combinational logic, a look-up table control block or a finite state machine may be conventionally needed, which again leads to more area overhead. With the above implementation of a linear-feedback shift register, savings in terms of at least a 4-bit D flip-flop and absence of control/combinatorial logic for the functions of round constant and round value generation may be achieved. Further, dedicated data storage components for a look-up table used in conventional designs may not be needed with the exemplary embodiment.

In the following description, an exemplary implementation of a ShiftRows controller is described. Compare the ShiftRows controller 332 of FIG. 3A.

For a ShiftRows operation, the last three rows of the state are shifted cyclically a certain offset, i.e. the first row is left unchanged; each byte of the second row is shifted to the left by one; each byte of the third row is shifted to the left by an offset of two and each byte of the last/fourth row is shifted to the left by an offset of three.

For typical AES designs, extra registers and control logic is required to perform ShiftRows. Typically, extensive control logic is required and enabled for ShiftRows to be performed in a single clock cycle. Extra registers and control logic would typically result in usage of precious area/space. Further, for conventional designs, there is a need to selectively read out a particular row using a decoder, increasing complexity and area needed. It is recognized that such additional components are typically in addition to state array components and key array components and therefore, typically incur area overheads outside of the state and key array area consumption.

In the exemplary embodiments described with reference to FIGS. 1 and 3A, the inventors have managed to eliminate such extensive control logic and achieved space/area savings.

In an exemplary embodiment, with the usage of controllable data processing state members (compare e.g. members e.g. 112 of FIG. 1 and e.g. members of box 318 of FIG. 3B) disposed at predetermined positions within the state array of components, a control block module (compare control block module 108 of FIG. 1 and control block 324 of FIG. 3A) may instruct the performance of AES operation ShiftRows based on a distribution over a plurality of predetermined clock cycles. The additional input port of the controllable data processing state members may be utilised to accomplish the above.

In the exemplary implementation, the whole ShiftRows operation is distributed to different clock cycles instead of one clock cycle to minimize the control logic required for circular byte shifts.

In the exemplary embodiment, predetermined clock cycles e.g. cycle 7, cycle 11 and cycle 15 are selected to conduct the ShiftRows operation. As such, the ShiftRows operation is distributed over a number of non-consecutive clock cycles.

Figure 5:
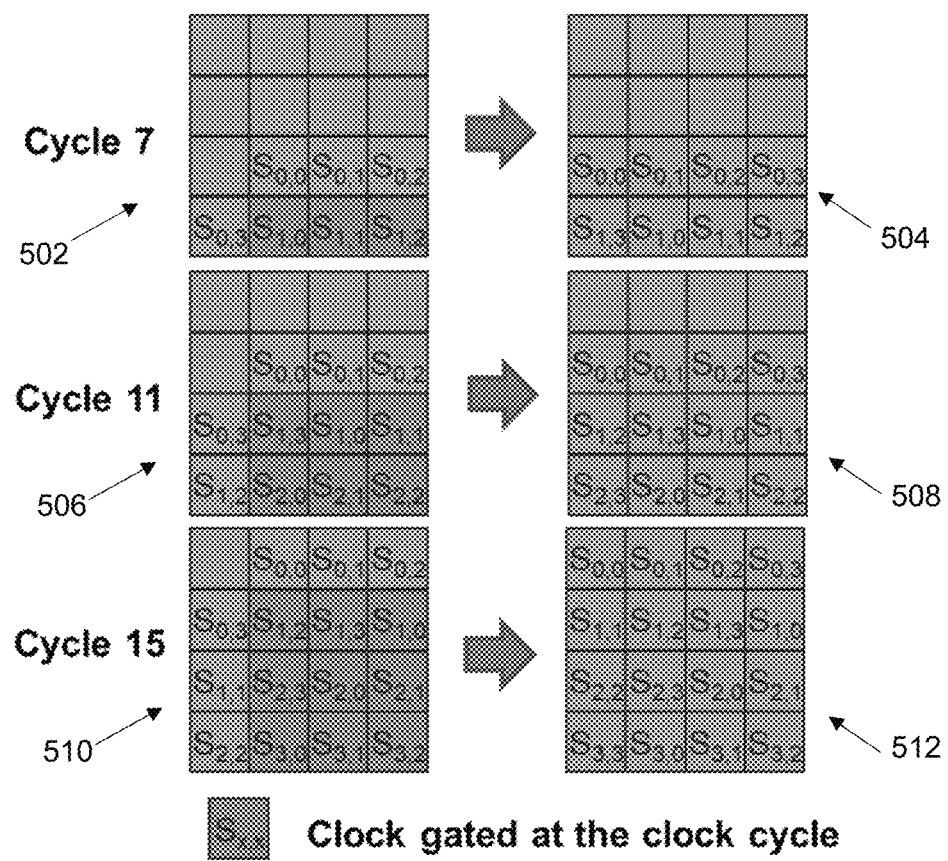
FIG. 5 is a schematic diagram illustrating clock gating performed at predetermined clock cycles in an exemplary embodiment.

FIG. 5 is a schematic diagram illustrating clock gating performed at predetermined clock cycles in the exemplary embodiment. The predetermined clock cycles with same counter bits value, e.g. cycles 7, 11, 15 are selected to reduce control mux bits.

At cycle 7 (numeral 502), the first, second and third stages are clock gated during the clock cycle 7. That is, the data processing components/members with state data $S_{1,2}$, $S_{1,1}$, $S_{1,0}$ hold data movement while data movement is allowed with the remaining state components or state members. At the end of cycle 7, at numeral 504, the fourth stage contains $S_{1,3}$ which is the next state data after $S_{1,2}$ (of the first stage). This is possible because the fourth stage comprises a scan flip-flop that has an additional input port (i.e. the SI port) to receive the data, with the scan flip-flop being scan-enabled (using the SE port) for the input selection. The data originally contained in the fourth stage, i.e. $S_{0,3}$, is allowed to flow to the fifth stage. As can be observed, besides the clock gated first, second and third stages, the other stages such as the fourth to seventh stages are allowed to flow data to the next coupled stage.

At cycle 11 (numeral 506), the first, second, third, fifth, sixth and seventh stages are clock gated during the clock cycle 11. That is, the data processing components/members with state data $S_{2,2}$, $S_{2,1}$, $S_{2,0}$, $S_{1,1}$, $S_{1,0}$, $S_{1,3}$ hold data movement while data movement is allowed with the remaining state components or state members. At the end of cycle 11, at numeral 508, the fourth stage contains $S_{2,3}$ which is the next state data after $S_{2,2}$ (of the first stage) and the eighth stage contains $S_{1,2}$ which is the state data originally from the fourth stage of the preceding cycle and after $S_{1,1}$ (of the fifth stage). This is possible because the fourth and eighth stages each comprises a scan flip-flop that has an additional input port (i.e. the SI port) to receive the data, with these scan flip-flops being scan-enabled (using the SE ports) for the input selection. The eighth stage has its additional input port connected to the output port of the fourth stage to receive the data. The data originally contained in the eighth stage, i.e. $S_{0,3}$, is allowed to flow to the ninth stage. As can be observed, besides the clock gated first, second, third, fifth, sixth and seventh stages, the other stages such as the fourth, eighth, ninth to eleventh stages are allowed to flow data to the next coupled stage.

At cycle 15 (numeral 510), the first, second, third, fifth, sixth, seventh, ninth, tenth and eleventh stages are clock gated during the clock cycle 15. That is, the data processing components/members with state data $S_{3,2}$, $S_{3,1}$, $S_{3,0}$, $S_{2,1}$, $S_{2,0}$, $S_{2,3}$, $S_{1,0}$, $S_{1,3}$, $S_{1,2}$, hold data movement while data movement is allowed with the remaining state components or state members. At the end of cycle 15, at numeral 512, the fourth stage contains $S_{3,3}$ which is the next state data after $S_{3,2}$ (of the first stage), the eighth stage contains $S_{2,2}$ which is the state data originally from the fourth stage of the preceding cycle and after $S_{2,1}$ (of the fifth stage), and the twelfth stage contains $S_{1,1}$ which is the state data originally from the eighth stage of the preceding cycle and after $S_{1,0}$ (of the ninth stage). This is possible because the fourth, eighth and twelfth stages each comprises a scan flip-flop that has an additional input port (i.e. the SI port) to receive the data, with these scan flip-flops being scan-enabled (using the SE ports) for the input selection. The twelfth stage has its additional input port connected to the output port of the eighth stage to receive the data. The data originally contained in the twelfth stage, i.e. $S_{0,3}$, is allowed to flow to the thirteenth stage. As can be observed, besides the clock gated first, second, third, fifth, sixth, seventh, ninth, tenth and eleventh stages, the other stages such as the fourth, eighth, twelfth, thirteenth to fifteenth stages are allowed to flow data to the next coupled stage.

Figure 6A:
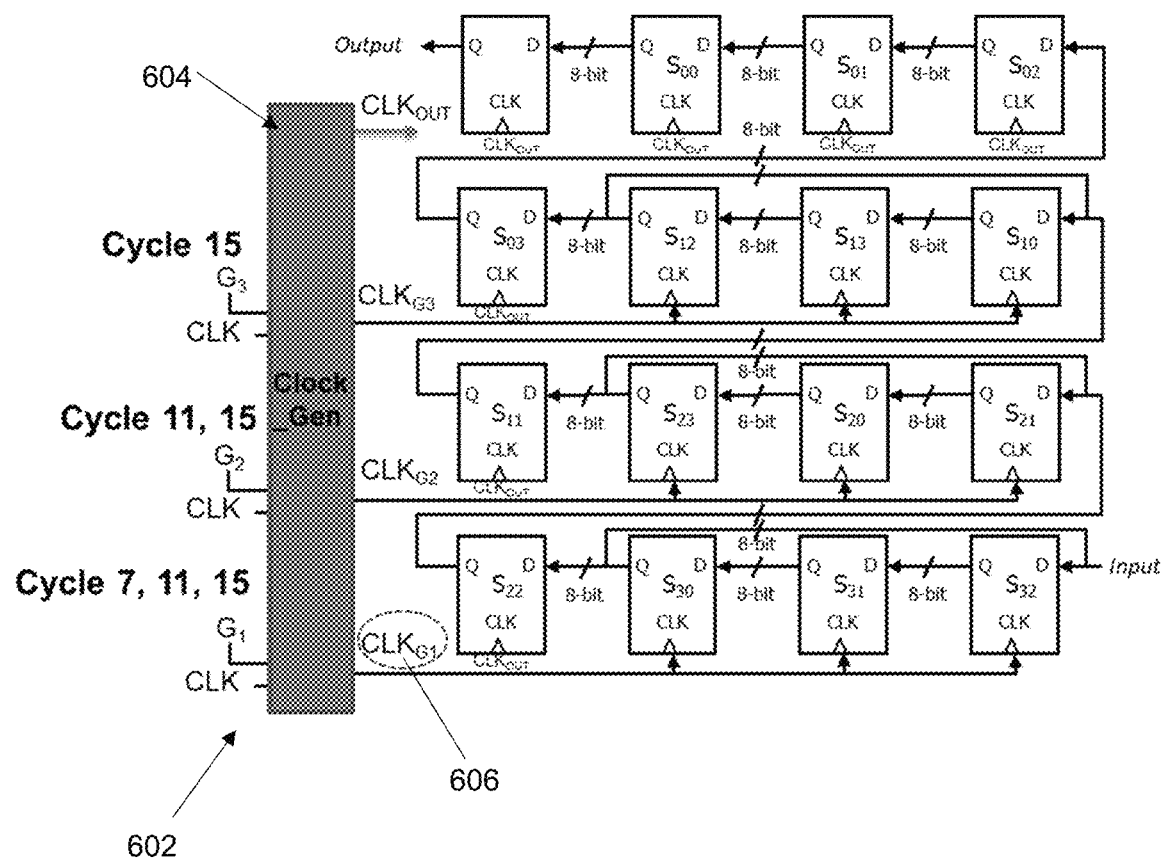
FIG. 6A is a schematic diagram for showing schematically an architecture for a ShiftRows controller in relation to a state array in an exemplary embodiment.
Figure 6B:
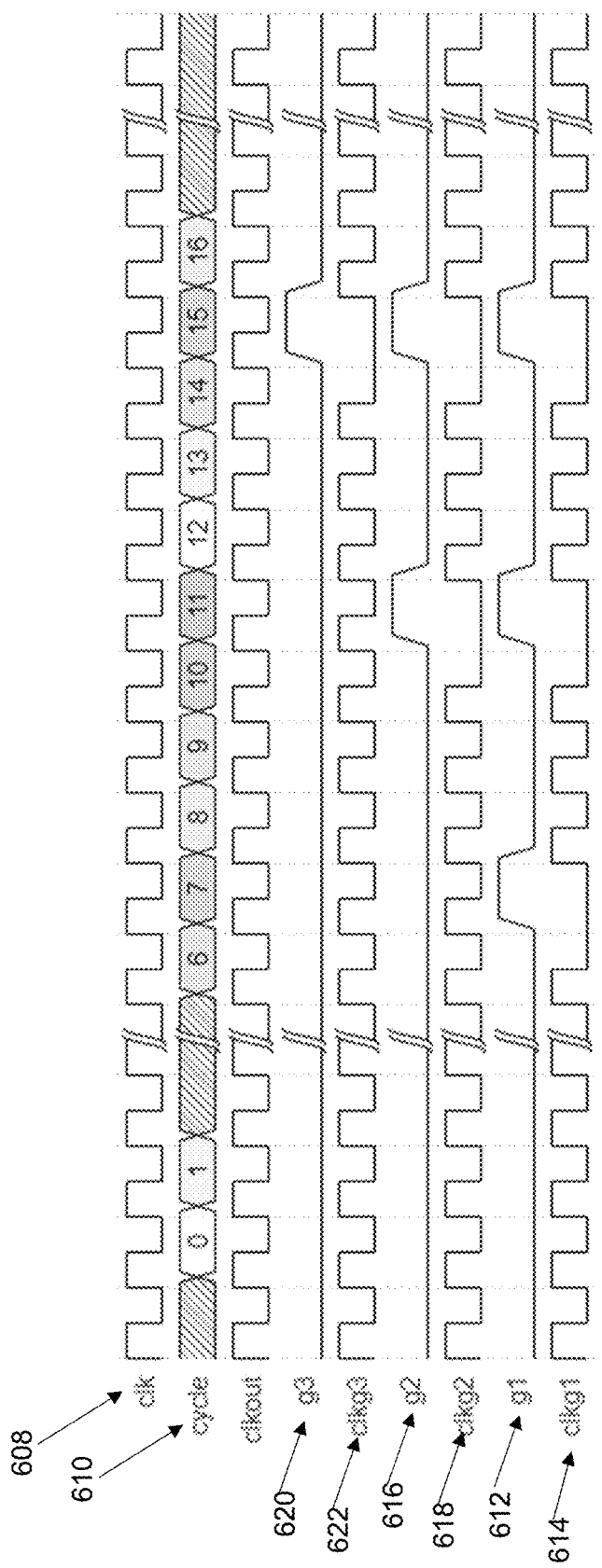
FIG. 6B is a schematic diagram illustrating a clock control schedule for implementing the ShiftRows controller in the exemplary embodiment.

FIG. 6A is a schematic diagram for showing schematically an architecture for a ShiftRows controller in relation to a state array in the exemplary embodiment. FIG. 6B is a schematic diagram illustrating a clock control schedule for implementing the ShiftRows controller in the exemplary embodiment.

The ShiftRows controller 602 comprises a clock generation block 604. The clock generation block 516 comprises one or more clock gating cells that function to output one or more control signals, e.g. $CLK_{G1}$, $CLK_{G2}$ and/or $CLK_{G3}$, to the state array. For example, numeral 606 indicates the output control signal $CLK_{G1}$. The output signal output control signal $CLK_{G1}$ is sent to the first, second and third stages of the state array during the clock cycles 7, 11 and 15. The output signal output control signal $CLK_{G2}$ is sent to the fifth, sixth and seventh stages of the state array during the clock cycles 11 and 15. The output signal output control signal $CLK_{G3}$ is sent to the ninth, tenth and eleventh stages of the state array during the clock cycle 15.

Referring to FIG. 6B, the notations, even though they are shown in small letters such as clkg1, clkg2, as opposed to capital letters, refer to the same signals of FIG. 6A, e.g. they refer to $CLK_{G1}$ and $CLK_{G2}$ respectively. In FIG. 6B, there is shown the regular system clock 608. For ease of illustration, there is shown the clock cycle count 610 whereby reference may be taken for the clock cycle counts of 7, 11 and/or 15. The input control signal g1 612 is shown to be high at cycle counts 7, 11 and 15 such that the output control signal clkg1 614 of the ShiftRows controller is pulled low at these clock cycles. As such, during these clock cycles, the data movement from the first, second and third stages are held/prevented. The input control signal g2 616 is shown to be high at cycle counts 11 and 15 such that the output control signal clkg2 618 of the ShiftRows controller is pulled low at these clock cycles. As such, during these clock cycles, the data movement from the fifth, sixth and seventh stages are held/prevented. The input control signal g3 620 is shown to be high at cycle count 15 such that the output control signal clkg3 622 of the ShiftRows controller is pulled low at this clock cycle. As such, during this clock cycle, the data movement from the ninth, tenth and eleventh stages are held/prevented.

In the exemplary embodiment, the signals g1, g2 and g3 may be interpreted as control signals from the control block module to perform clock gating and the signals clkg1, clkg2 and clkg3 may be interpreted as control signals from the control block module to hold one or more data movement within the state array of components.

In the exemplary embodiment, one or more clock gating cells are employed to control byte shift and minimize power consumption. During the target cycle, e.g. cycles 7, 11 and/or 15, state registers (such as the second and third stages) which do not require data updates are clock gated by a 1-bit clock gating cell. The data in these registers are not shifted during the target clock cycle. The remaining of the state registers may use mux (of the scan flip-flops) to control data switch(es).

In the design of the exemplary embodiment, in total, 3 8-bit 2-to-1 muxes (e.g. scan flip-flops) and 3 1-bit clock gating cells are used for the ShiftRows operation. As shown, the 3 8-bit 2-to-1 muxes are combined with flip-flops in the state array (i.e. scan flip-flops) to further reduce area. During the respective target cycles, there is no dynamic power consumption in the clock gated registers. The inventors recognise that there can be a savings in terms of mux (from 13 to 3) through the distribution of the operation to different clock cycles. The one or more clock gating cells may reduce the requirement of an 8-bit mux i.e. only using the one or more clock gating cells. Further, with selection of the clock cycles with same counter bits value, e.g. cycles 7, 11 and 15, a 5-bit control mux may be reduced to a 3-bit control mux.

As described, the control signals in the exemplary embodiment are relatively simpler compared to prior designs as only 3 predetermined/special clock cycles with same counter bits value, e.g. cycles 7, 11, 15 are selected to reduce control mux bits. The whole ShiftRows operation is distributed to different clock cycles instead of a single clock cycle to minimize/eliminate the control logic otherwise required for circular byte shift. The row-based clocking scheduling allows data to be shifted inside the state array and it is recognised that the same principle can allow multiple operations to be performed on the same state array with minimum hardware overhead.

In the following description, an example of a single substitution box (S-Box) of predetermined values is shown in an exemplary embodiment. The single S-Box is accessible and shared to both the state array of components and the key array of components. Compare the shared S-Box block 340 of the functional block 326 of FIG. 3A.

Figure 7:
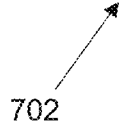
FIG. 7 is an example of a single shared substitution box (S-Box) in an exemplary embodiment.

FIG. 7 is an example of a single shared substitution box (S-Box) in an exemplary embodiment. The S-Box 702 is used to perform SubBytes and SubWord transformations. In the exemplary embodiment, it is recognised that a relatively compact shared S-Box block is used. The same S-Box 702 is used for both SubBytes operations in the state array and SubWord operations in the key array. In the exemplary embodiment, it can take 16 clock cycles to calculate all 16 SubBytes and 4 clock cycles for 4 SubWord operations. Each SubBytes and SubWord data is shifted to the S-Box 702 for transformation in different clock cycles.

In the exemplary embodiment, a S-Box controller (compare the S-Box controller 336 of the control block 324 of FIG. 3A) functions to instruct transmission of suitable inputs to the shared S-Box block, or the shared S-Box, and to instruct the retrieval of outputs after the processing with the shared S-Box block. For example, the inputs may be state data and/or key data and the outputs may be transformations for, for example, SubBytes operations and SubWord operations.

The inventors recognise that in conventional designs, typically, more than one S-Box blocks are employed because the S-Box is required by both state array and key array. Typically, such multiple look-up S-Boxes are stored in different locations and incur space/area overheads. As such, with the above exemplary embodiment, space savings may be achieved.

In the following description, an exemplary implementation of a MixColumns controller and a MixColumns block of a functional block is described. Compare the MixColumns controller 334 of the control block 324, and the parallel MixColumns block 346 of the functional block 326 of FIG. 3A.

As known in the art, the MixColumns operation is a column-based transformation.

Figure 8A:
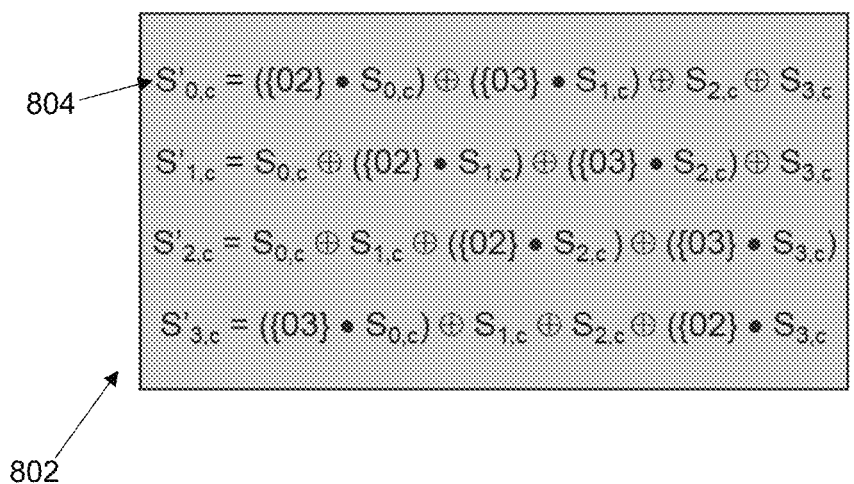
FIG. 8A shows an exemplary set of operations for a MixColumns operation in an exemplary embodiment.

FIG. 8A shows an exemplary set of operations for a MixColumns operation in an exemplary embodiment. As can be seen from the set 802 of operations, each MixColumns result is affected or related to four inputs representing a column of a state array. For example, referring to numeral 804, $S'_{0,c}$ which is the MixColumns result for row 0, column c, is related to state data from column c, rows 0 to 3, i.e. the state data being $S_{0,c}$, $S_{1,c}$, $S_{2,c}$ and $S_{3,c}$.

In the exemplary embodiment, the MixColumns controller of a control block module instructs shifting of state data of a state array to a functional block module for processing. At the parallel MixColumns block, one or more parallel processing members may obtain as an input a plurality of inputs simultaneously in the form of a column, i.e. the state data, from the state array. The one or more parallel processing members can process the state data and output a MixColumns value. The value is indicative of a row value for the state array and is returned to the state array by the MixColumns controller of the control block module for shifting into the state array.

Figure 8B:
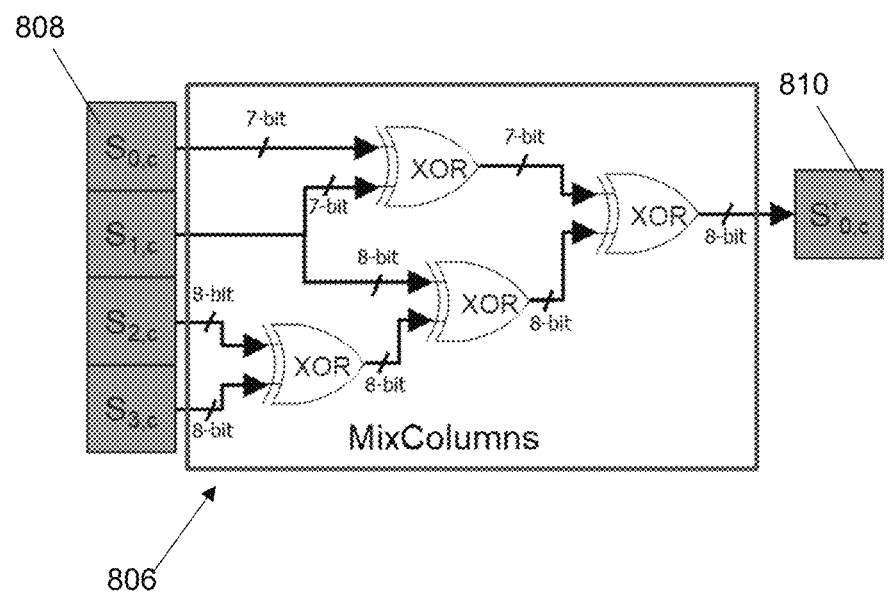
FIG. 8B is a schematic diagram illustrating a parallel processing architecture of a MixColumns block in the exemplary embodiment.

FIG. 8B is a schematic diagram illustrating a parallel processing architecture of the MixColumns block in the exemplary embodiment. There is provided a parallel processing member 806 and it is exemplarily illustrated in FIG. 8B the processing for row 0 for column c. The state data, in the form of a column, from column c, i.e. $S_{0,c}$, $S_{1,c}$, $S_{2,c}$ and $S_{3,c}$ are input (see numeral 808) in parallel into the processing member 806 to obtain an output 810 for row 0, column c, i.e. $S'_{0,c}$.

In the processing member 806, there is provided 2 8-bit and 2 7-bit XOR gates. The processing member 806 can output an 8-bit MixColumns result. The MixColumns results are processed/calculated column by column. As such, the same block and the processing member is re-used for different columns. As the processing is parallel in nature as described, it takes 4 clock cycles to calculate all 4 columns of the state array.

It will be appreciated that other similar processing members are provided in the exemplary embodiment to obtain the MixColumns results for rows 1, 2 and 3, using the same state data from column c, also in parallel format to each of these other processing members. In the exemplary embodiment, these other similar processing members may be similar or identical to the parallel processing member 806. As an example, there may be provided four similar parallel processing members (compare parallel processing member 806) for processing for four rows.

In the exemplary embodiment, the one or more processing members e.g. 806 are comprised in the MixColumns block and are implemented by 10 8-bit and 4 7-bit XOR gates. In total, the inventors recognise that only 108 bits XOR gates and thus, only a purely combinational logic design, are used for the MixColumns operation in the exemplary embodiment.

The inventors recognise that in conventional AES designs, MixColumns blocks are typically implemented using registers and control logic. Registers are typically used for temporary data storage in such operations but the registers and control logic lead to extensive area overheads. As both the input and output data width are typically 32 bits, in conventional designs, 32 bits D flip-flops, 32 bits XOR gates, 32 bits muxes, 8 bits adders and extra combinational logic are typically required to generate the enable signal to perform a MixColumns operation. It is recognised that a typical 1-bit D flip-flop and a typical 1-bit adder are about two to three times larger in size than a 2-input XOR gate.

In addition, in the exemplary embodiment, using a parallel processing architecture, the MixColumns operation is accomplished in 4 clock cycles (i.e. the number of columns). The inventors recognise that in conventional designs, it typically takes 16 cycles to perform a MixColumns operation. As such, in the exemplary embodiment, there can be area savings, time efficient and power savings in using the one or more parallel processing members for a MixColumns operation as compared to conventional designs.

In the following description, an exemplary implementation of a shared AddRoundKey and round keys generation block, that comprises an AddRoundKey circuit/block and a round keys generation block, is described. Compare the S-box controller 336, an AddRoundKey controller 338, the AddRoundKey block 342 and the round keys generation block 344 of FIG. 3A.

In an exemplary embodiment, shared circuitry in the form of the shared AddRoundKey and round keys generation block is provided and the block is accessible to the state array of components and the key array of components. The block is arranged to output a round key to the key array of components and an input data to the state array of components. The input data may be directed at an AddRoundKey operation and/or a Subbytes operation.

Figure 9A:
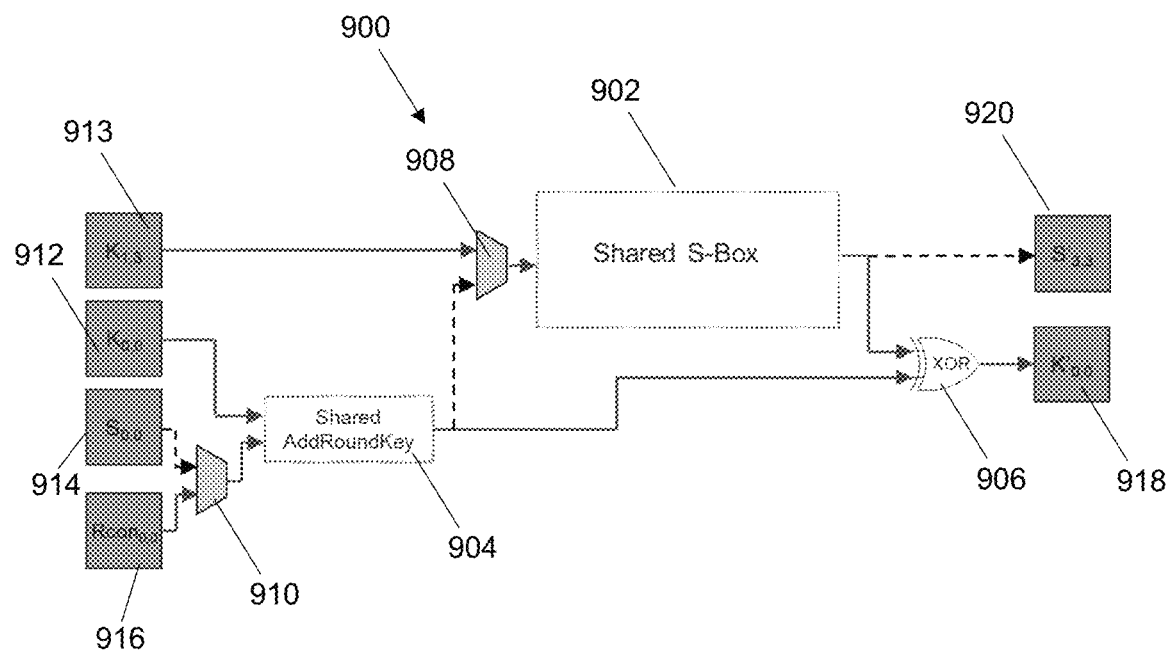
FIG. 9A is a schematic diagram illustrating a shared AddRoundKey and round keys generation block for a round key generation operation in an exemplary embodiment.

FIG. 9A is a schematic diagram illustrating a shared AddRoundKey and round keys generation block for a round key generation operation in the exemplary embodiment. During a round key generation operation, the shared block may be referred to as the round keys generation block (Compare the round keys generation block 344 of FIG. 3A).

Figure 9B:
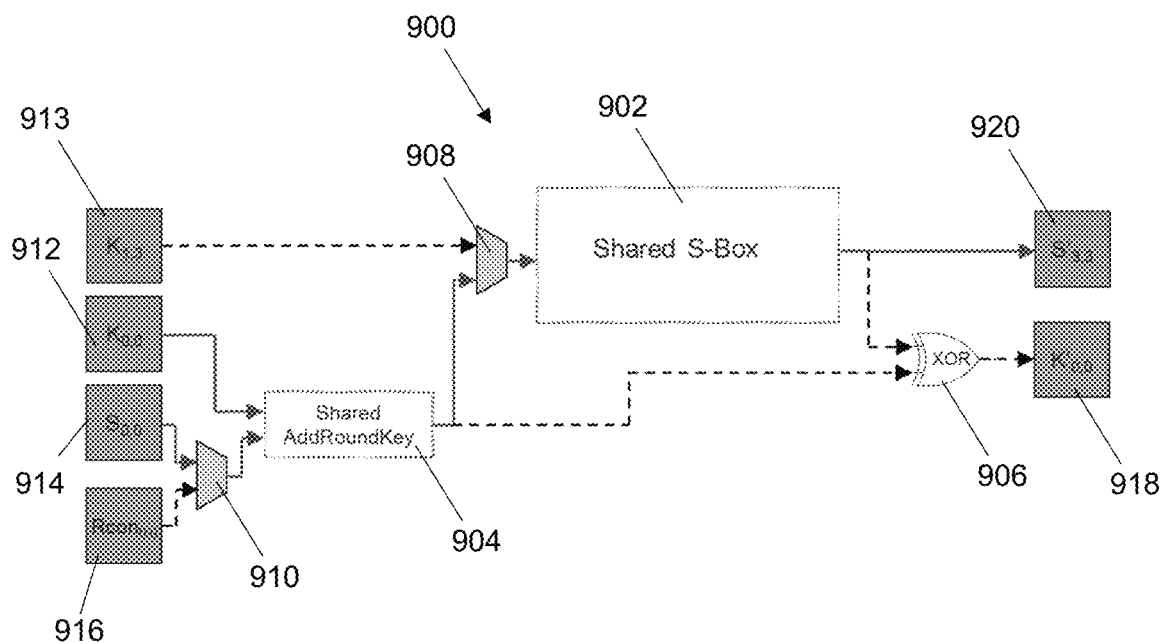
FIG. 9B is a schematic diagram illustrating a shared AddRoundKey and round keys generation block for an AddRoundKey operation and a Subbytes operation in the exemplary embodiment.

FIG. 9B is a schematic diagram illustrating a shared AddRoundKey and round keys generation block for an AddRoundKey operation and/or a Subbytes operation in the exemplary embodiment. During an AddRoundKey operation and/or a Subbytes operation, the shared block may be referred to as the AddRoundKey block (Compare the AddRoundKey block 342 of FIG. 3A).

For ease of illustration, the active data flows in FIGS. 9A and 9B are shown in solid lines and non-active data flows are shown with dashed lines.

In the exemplary embodiment, the shared circuitry 900 accesses the shared S-Box block 902. A shared AddRoundKey XOR block 904 is provided for both the round key generation dataflow and the AddRoundKey dataflow. An XOR gate 906 is provided for the round key generation dataflow. Two multiplexers (mux) 908, 910 are provided such that the control module block may instruct a round key generation dataflow (FIG. 9A), an AddRoundKey and/or a Subbytes dataflow (FIG. 9B).

The shared circuitry 900 has at its inputs key data 912 and another key data 913 (shown exemplarily as $K_{0,0}$ 912 and $K_{1,3}$ 913), state data 914 (shown exemplarily as $S_{0,0}$ 914) and round constant value 916 (shown exemplarily as $Rcon_{0,0}$ 916). The shared circuitry 900 may output, depending on the dataflow, processed/transformed next key data 918 (shown exemplarily as $K'_{0,0}$ 918) or processed/transformed next state data 920 (shown exemplarily as $S'_{3,3}$ 920).

For FIG. 9A, for a round key generation dataflow, the first multiplexer 910 is instructed to accept the round constant value 916, to transmit as an input to the shared AddRoundKey XOR block 904 (i.e. to be processed with the key data 912). The second multiplexer 908 is instructed to accept the another key data 913, to transmit as an input to the shared S-Box block 902 (i.e. for processing using the S-Box). The outputs from the shared S-Box block 902 and the shared AddRoundKey XOR block 904 are transmitted to XOR gate 906 and the output of the XOR gate 906 is output as the next key data 918.

For FIG. 9B, for an AddRoundKey and/or S-Box Subbytes dataflow, the first multiplexer 910 is instructed to accept the state data 914, to transmit as an input to the shared AddRoundKey XOR block 904 (i.e. to be processed with the key data 912). The second multiplexer 908 is instructed to accept the processed state data, to transmit as an input to the shared S-Box block 902 (i.e. for further processing using the S-Box, Subbytes). The output from the shared S-Box block 902 is output as the next state data 920, bypassing the XOR gate 906.

In the exemplary embodiment, the operations of the multiplexers 908, 910 may be instructed by the control block module at a different clock cycle count.

Thus, in the exemplary embodiment, only an additional 8-bit XOR circuit and an 8-bit mux are used for round keys generation. The shared AddRoundKey XOR gates at block 904 also perform AddRoundKey operations to generate input data for the state array. The same 8-bit XOR gate at block 904 is reused for each state byte and round key byte in different clock cycles.

In the exemplary embodiment, it becomes possible to share hardware for the state array and the key array and it is possible to schedule inputs using MUXes, e.g. 908, 910, so that the same hardware can be used to perform different functional operations at different clock cycles, or clock cycle count (i.e. time-multiplexing instructed by the control module block). In total, it is recognised that only the additional 8-bit XOR circuit and 16-bit mux (for two 8-bit muxes) are used.

With the exemplary embodiment, the inventors recognise that there can be area savings achieved over the current art. It is recognised that in conventional AES designs, XOR gates are used to perform AddRoundKey, while a S-Box and control logic are used to generate round keys. Typically, these functions are implemented separately as different hardware blocks and typically, both blocks occupy their own area. In addition, typically, two S-Boxes are used in the current art for the above functions. As such, with the above exemplary embodiment, it becomes possible to have substantial area savings and therefore, power and cost savings, over the current art.

In the following description, the dataflow of an exemplary embodiment of an AES device is described. The exemplary embodiment incorporates the examples, e.g. hardware, logic etc., as described with reference to the preceding figures/drawings. As such, the naming conventions are understood to be the same in the present exemplary embodiment.

In the exemplary embodiment, the dataflow within the AES device and the various inputs to and/or outputs from the state array and/or the key array are coordinated by the control block module. The dataflow is also shown inside the state array and the key array at different clock cycles.

For ease of illustration, the active data flows in FIGS. 10A to 10B, 11A to 11C, 12A to 12C, and 13A to 13C are shown in solid lines and non-active data flows are shown with dotted lines.

In the description below, for the state array, the following notations are followed: Sxx: Current state data; S'xx: Next state data; B'xx: Next state data after SubByte. For the key array, the following notations are followed: Kxx: Previous key data; K'xx: Current key data; K"xx: Next key data. The connections of each stage of the state array and the key array are understood to be already established/connected e.g. for MixColumns shift-in, for SubWord operations etc. and may not be used or active in every clock cycle.

Figure 10A:
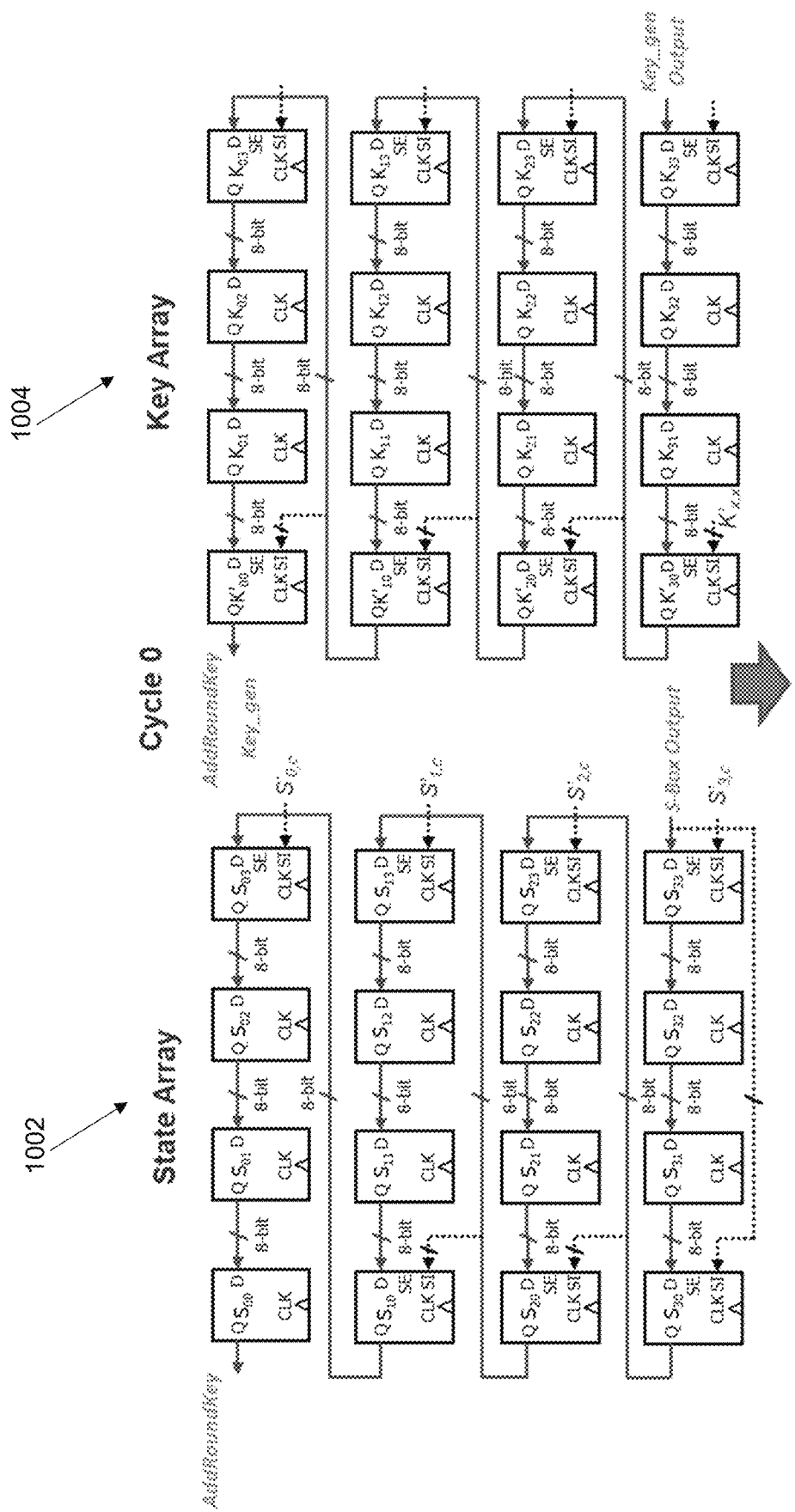
FIG. 10A is a schematic illustration of a dataflow of an AES device at cycle 0 in an exemplary embodiment.

FIG. 10A is a schematic illustration of the dataflow of the AES device at cycle 0 in the exemplary embodiment. In FIG. 10A, the state array 1002 is initialised with the current state data and the key array 1004 is initialised with the first AddRoundkey and current key data. That is, in the first row of the state array 1002, the state data $S_{00}$, $S_{01}$, $S_{02}$, $S_{03}$ are contained in the respective flip-flops, i.e. the sixteenth, fifteenth, fourteenth and thirteenth stages respectively. In the last/fourth row of the state array 1002, the state data $S_{30}$, $S_{31}$, $S_{32}$, $S_{33}$ are contained in the respective flip-flops, i.e. the fourth, third, second and first stages of the state array 1002 respectively. For the key array 1004, the current key data are loaded in the first column, i.e. the key data are $K'_{00}$, $K'_{10}$, $K'_{20}$, $K'_{30}$ and the data are in the sixteenth, twelfth, eighth and fourth stages of the key array 1004 respectively.

At cycle 0, the active data flows are as per normal operations, i.e. for the first stage to the fifteenth stage, the output Q port of each flip-flop is connected to the input D port of the next flip-flop (i.e. of the next stage) for dataflow. For the state array 1002, the input D port of the first stage flip-flop is connected to an S-Box Subbytes output (compare e.g. FIG. 9B for the shared AddRoundKey and round keys generation block) for the next Subbytes-transformed state data. The output Q port of the sixteenth stage flip-flop is connected to the input of the shared AddRoundKey and round keys generation block for an AddRoundkey operation. For the key array 1004, the input D port of the first stage flip-flop is connected to a round key generator output (compare e.g. FIG. 9A for the shared AddRoundKey and round keys generation block). The output Q port of the sixteenth stage flip-flop is connected to the input of the shared AddRoundKey and round keys generation block for an AddRoundkey and key generation operation.

Figure 10B:
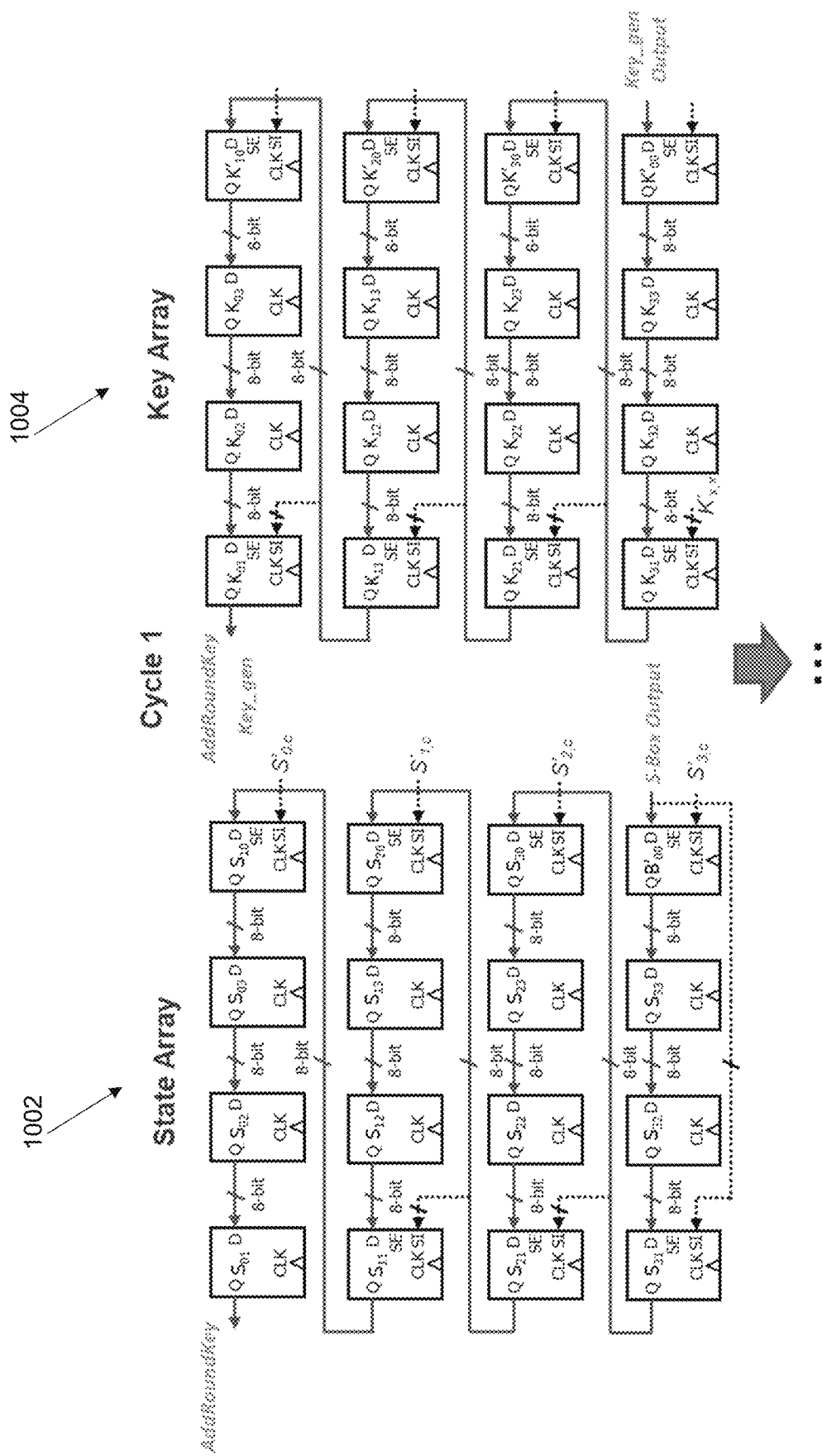
FIG. 10B is a schematic illustration of the dataflow of the AES device at cycle 1 in the exemplary embodiment.

FIG. 10B is a schematic illustration of the dataflow of the AES device at cycle 1 in the exemplary embodiment. The active data flows are as per cycle 0. As can be observed, at the state array 1002, the state data has been shifted to the next stage. At the first stage of the state array 1002, the state data is $B'_{00}$ which is the Subbytes result of $S_{00}$. At the first stage of the key array 1004, the key data is $K'_{00}$ which is the current key data shifted from the sixteenth stage.

The dataflow and operations continue with each clock cycle with the same active data flows until cycle 7.

Figure 11A:
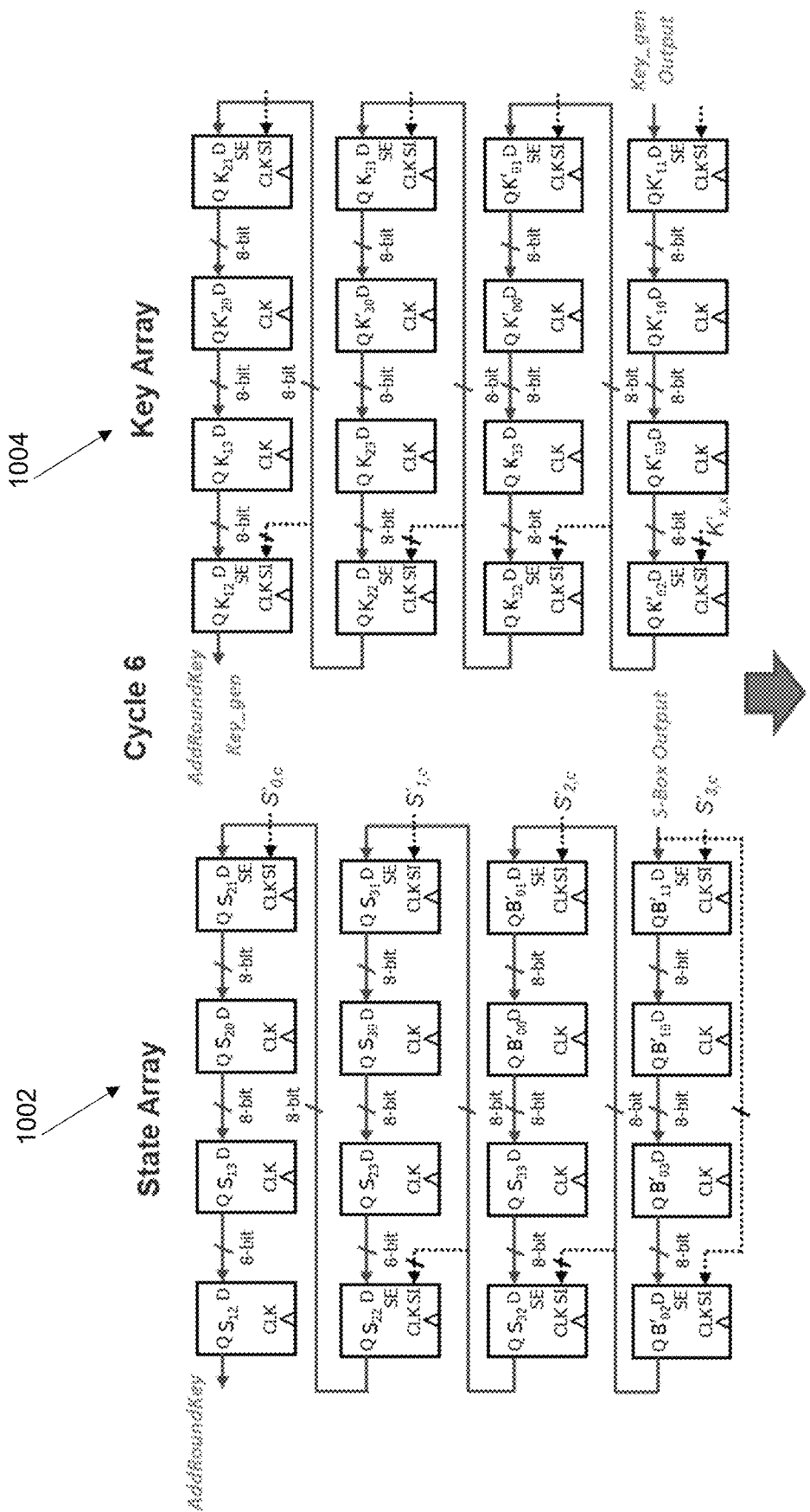
FIG. 11A is a schematic illustration of the dataflow of the AES device at cycle 6 in the exemplary embodiment.

FIG. 11A is a schematic illustration of the dataflow of the AES device at cycle 6 in the exemplary embodiment. Cycle 6 is first shown so that a portion or a start of a ShiftRows operation at cycle 7 may be better illustrated.

In FIG. 11A, at the state array 1002, the state data $B'_{00}$ (originally at the first stage at cycle 1) has now been shifted to the sixth stage. The state data originally at the sixteenth to twelfth stages at cycle 1 have been Subbytes-transformed and have been shifted to the fifth to first stages at cycle 6. Similarly, at the key array 1004, the current key data $K'_{00}$ (originally at the first stage at cycle 1) has now been shifted to the sixth stage. The key data originally at the sixteenth to twelfth stages at cycle 1 have been processed and have been shifted to the fifth to first stages at cycle 6. The current key data $K'_{10}$ at the twelfth stage during cycle 0 remains $K'_{10}$ and resides in the second stage.

Figure 11B:
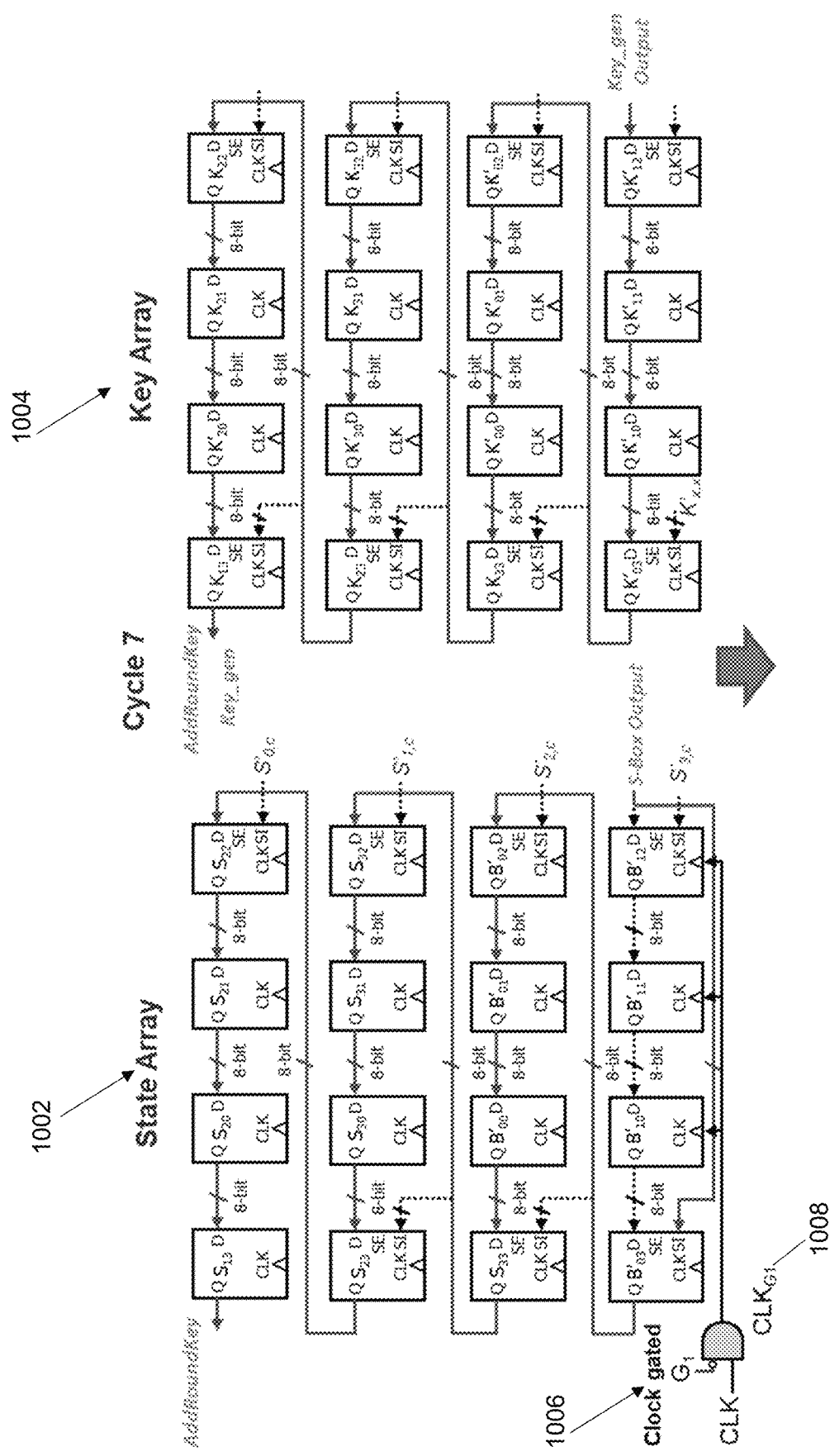
FIG. 11B is a schematic illustration of the dataflow of the AES device at cycle 7 in the exemplary embodiment.

FIG. 11B is a schematic illustration of the dataflow of the AES device at cycle 7 in the exemplary embodiment. At cycle 7, the ShiftRows controller commences clock gating. Compare e.g. FIGS. 6A and 6B. For the key array 1004, the active data flows are not modified from the previous cycles.

At cycle 7, the active data flow of the last row (or row 3) of the state array 1002 is modified. The control block module implementing the ShiftRows controller (shown schematically as cell 1006) outputs the control signal $CLK_{G1}$ 1008 to instruct the first, second and third stages of the state array 1002 to hold/prevent data movement. As such, there is no active data flow from the first to the fourth stage of the state array 1002.

At the fourth stage, using the additional input port (i.e. SI port) of the enabled scan flip-flop disposed at the fourth stage, the active data flow to this fourth stage is from a connection to the S-Box Subbytes output. At this cycle, it is observed that the state data in the fourth to the first stages of the state array 1002 are $B'_{03}$, $B'_{10}$, $B'_{11}$, $B'_{12}$ respectively. As such, at least one of the scan flip-flop in the exemplary embodiment has been instructed by the control block module for the performance of one or more AES operations based on a clock cycle count which is cycle 7 in this case.

Figure 11C:
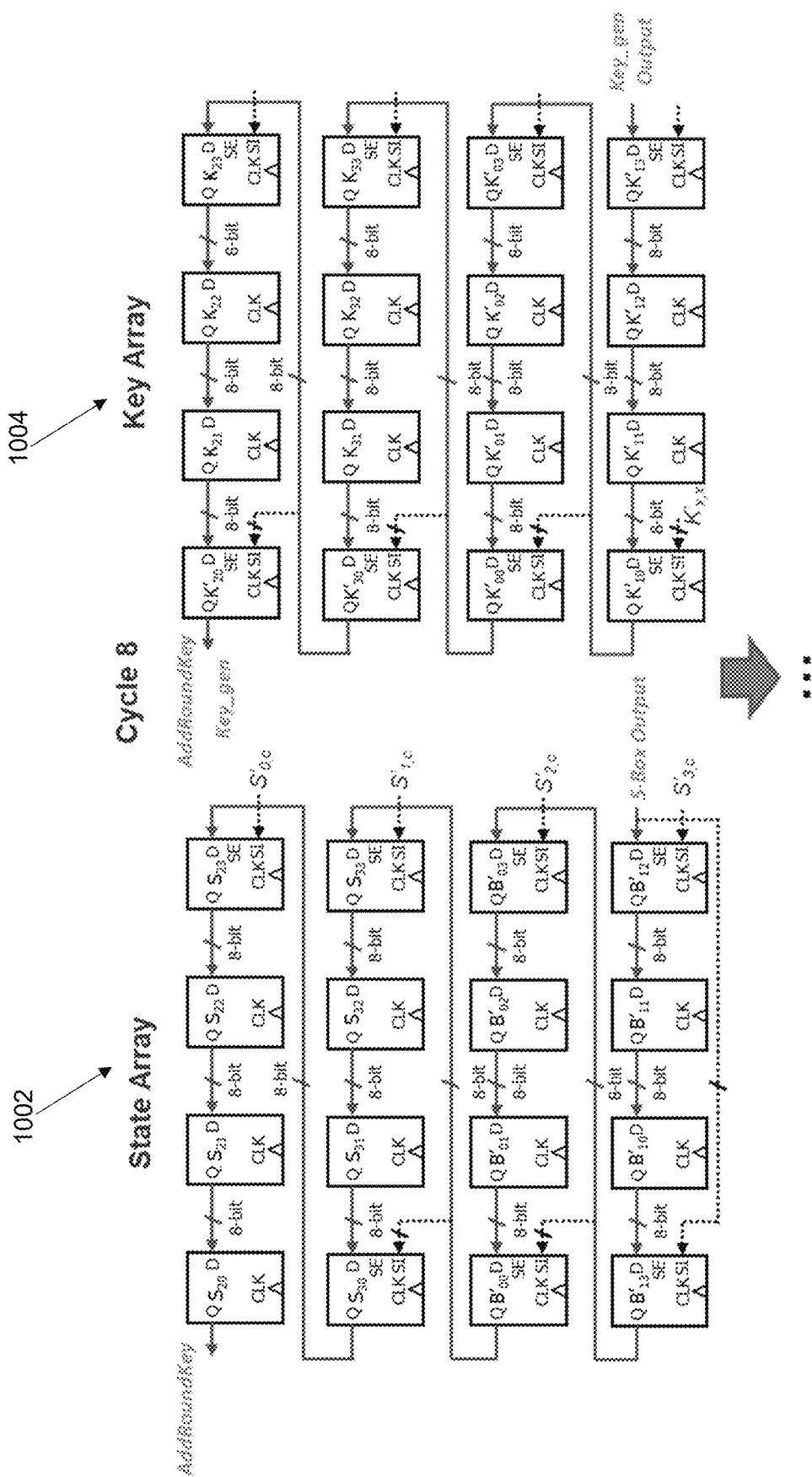
FIG. 11C is a schematic illustration of the dataflow of the AES device at cycle 8 in the exemplary embodiment.

FIG. 11C is a schematic illustration of the dataflow of the AES device at cycle 8 in the exemplary embodiment. Cycle 8 is shown after the clock gating at cycle 7 so that the portion or the start of a ShiftRows operation at cycle 7 may be better illustrated.

At cycle 8, the control signal $CLK_{G1}$ 1008 is removed and data flow within the state array 1002 is allowed to continue. The active data flow returns to as per the clock cycles before cycle 7, e.g. as per cycle 0. At this cycle, it is observed that the state data in the fourth to the first stages of the state array 1002 are $B'_{13}$, $B'_{10}$, $B'_{11}$, $B'_{12}$ respectively. That is, the state data has been maintained in the third to first stages. The state data in the fourth stage has been shifted from S-Box Subbytes output, i.e. it is the next state data after $B'_{12}$. The state data of the fourth stage of cycle 7 has been allowed to be shifted to the fifth stage, i.e. the fifth stage now contains $B'_{03}$. The rest of the stages from the fifth stage have been shifted accordingly as well.

The dataflow and operations continue with each clock cycle with the same active data flows until cycle 11.

Figure 12A:
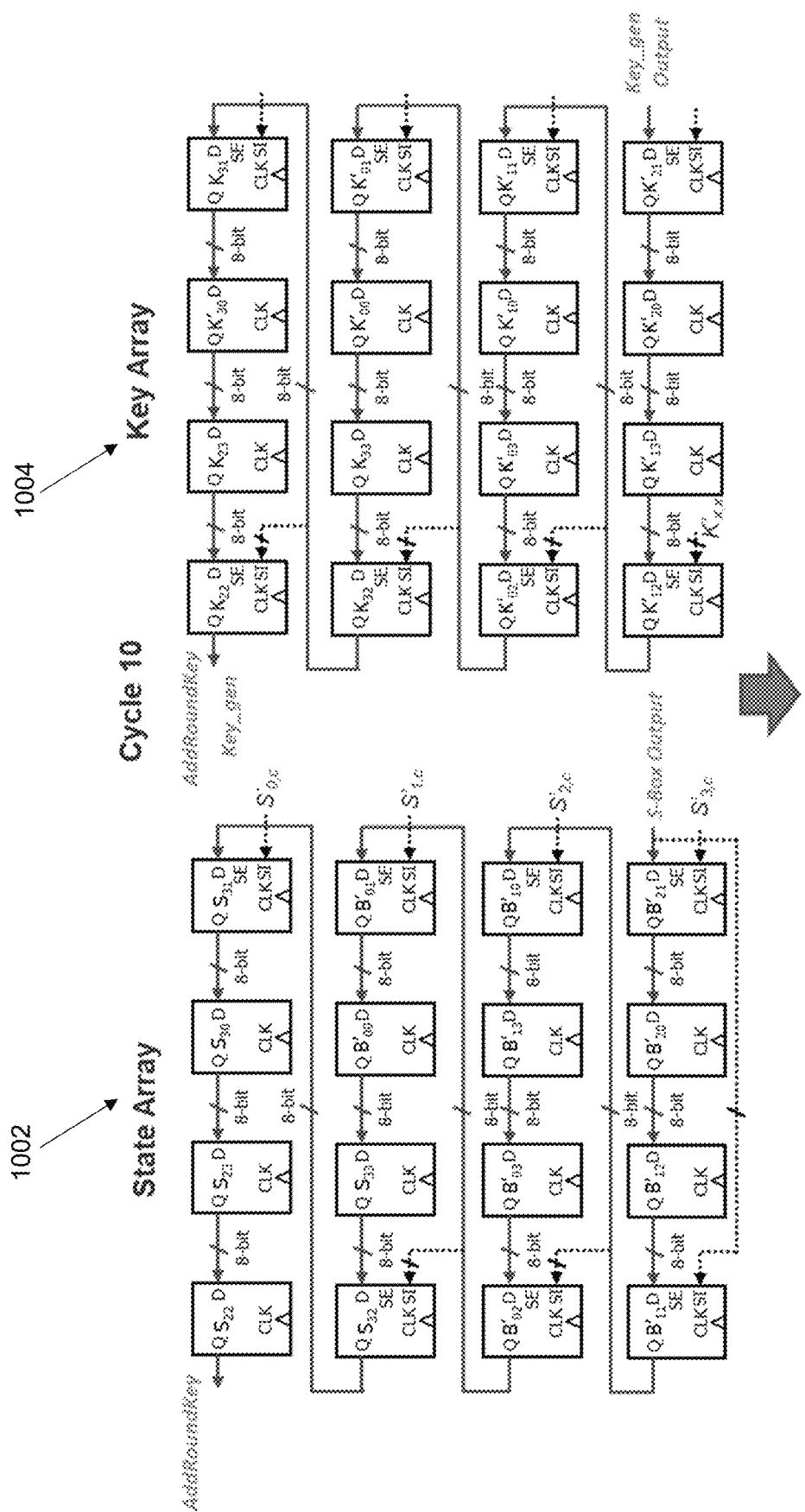
FIG. 12A is a schematic illustration of the dataflow of the AES device at cycle 10 in the exemplary embodiment.

FIG. 12A is a schematic illustration of the dataflow of the AES device at cycle 10 in the exemplary embodiment. Cycle 10 is first shown so that a portion or a continuation of the ShiftRows operation at cycle 11 may be better illustrated.

In FIG. 12A, at the state array 1002, the state data $B'_{12}$ (originally at the first stage at cycle 8) has now been shifted to the third stage. The state data originally at the sixteenth and fifteenth stages at cycle 8 have been Subbytes-transformed and have been shifted to the second and first stages at cycle 10, i.e. $B'_{20}$ and $B'_{21}$ respectively.

Figure 12B:
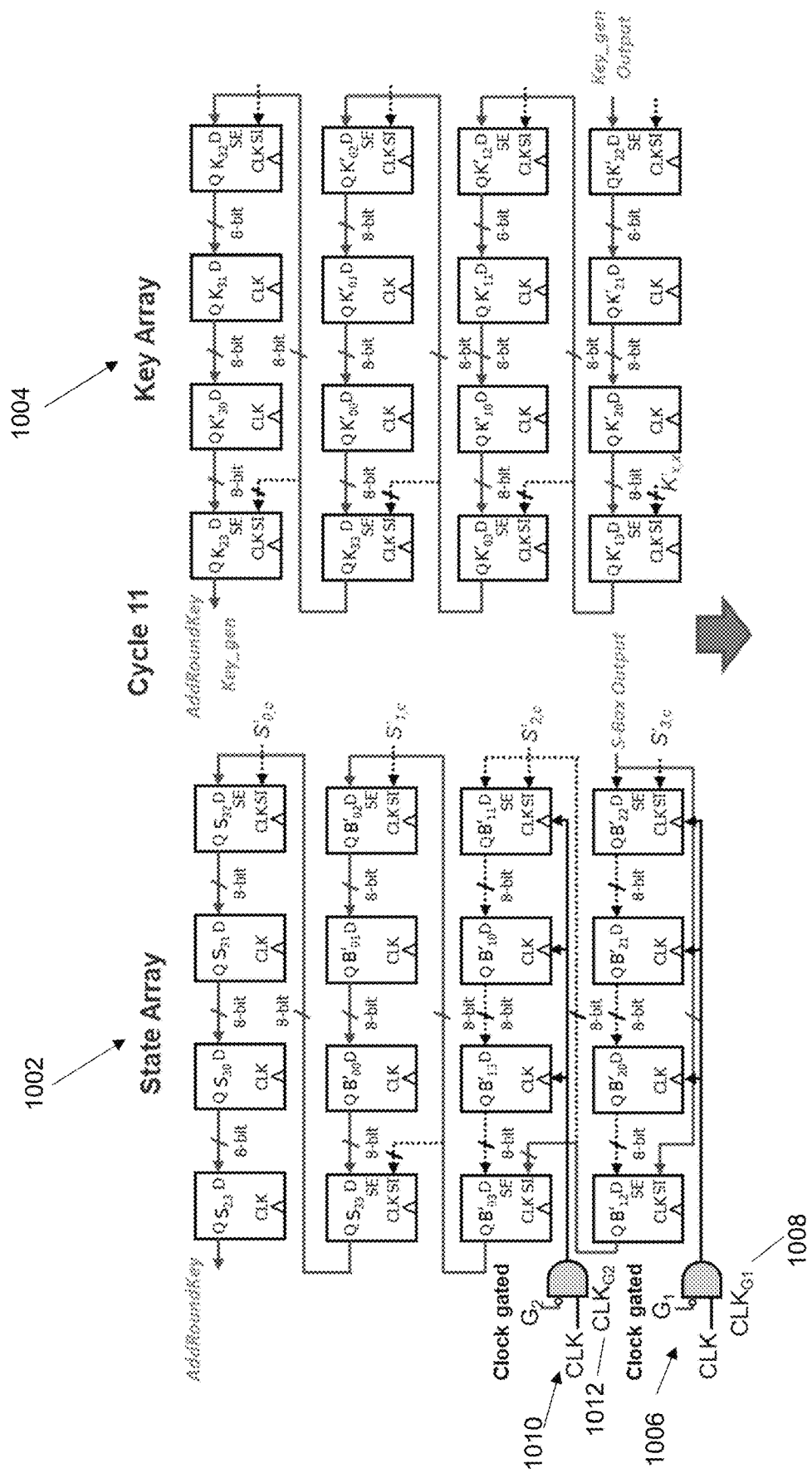
FIG. 12B is a schematic illustration of the dataflow of the AES device at cycle 11 in the exemplary embodiment.

FIG. 12B is a schematic illustration of the dataflow of the AES device at cycle 11 in the exemplary embodiment. At cycle 11, the ShiftRows controller commences clock gating as with cycle 7. Compare e.g. FIGS. 6A and 6B. For the key array 1004, the active data flows are not modified from the previous cycles.

At cycle 11, the active data flow of the third and last rows (or row 2 and row 3) of the state array 1002 is modified. The control block module implementing the ShiftRows controller (shown schematically as respective cells 1006, 1010) outputs the control signals $CLK_{G1}$ 1008 and $CLK_{G2}$ 1012 to instruct the first, second, third, fifth, sixth and seventh stages of the state array 1002 to hold/prevent data movement. $CLK_{G1}$ 1008 affects the first, second and third stages while $CLK_{G2}$ 1012 affects the fifth, sixth and seventh stages.

As such, there is no active data flow from the first to the fourth stages of the state array 1002 and from the fifth to eighth stages of the state array 1002.

At the fourth stage, using the additional input port (i.e. SI port) of the enabled scan flip-flop disposed at the fourth stage, the active data flow to this fourth stage is from a connection to the S-Box Subbytes output. At the eighth stage, using the additional input port (i.e. SI port) of the enabled scan flip-flop disposed at the eighth stage, the active data flow to this eighth stage is from a connection to the fourth stage.

At this cycle, it is observed that the state data in the fourth to the first stages of the state array 1002 are $B'_{12}$, $B'_{20}$, $B'_{21}$, $B'_{22}$ respectively. It is observed that the state data in the eighth to the fifth stages of the state array 1002 are $B'_{03}$, $B'_{13}$, $B'_{10}$, $B'_{11}$ respectively.

Figure 12C:
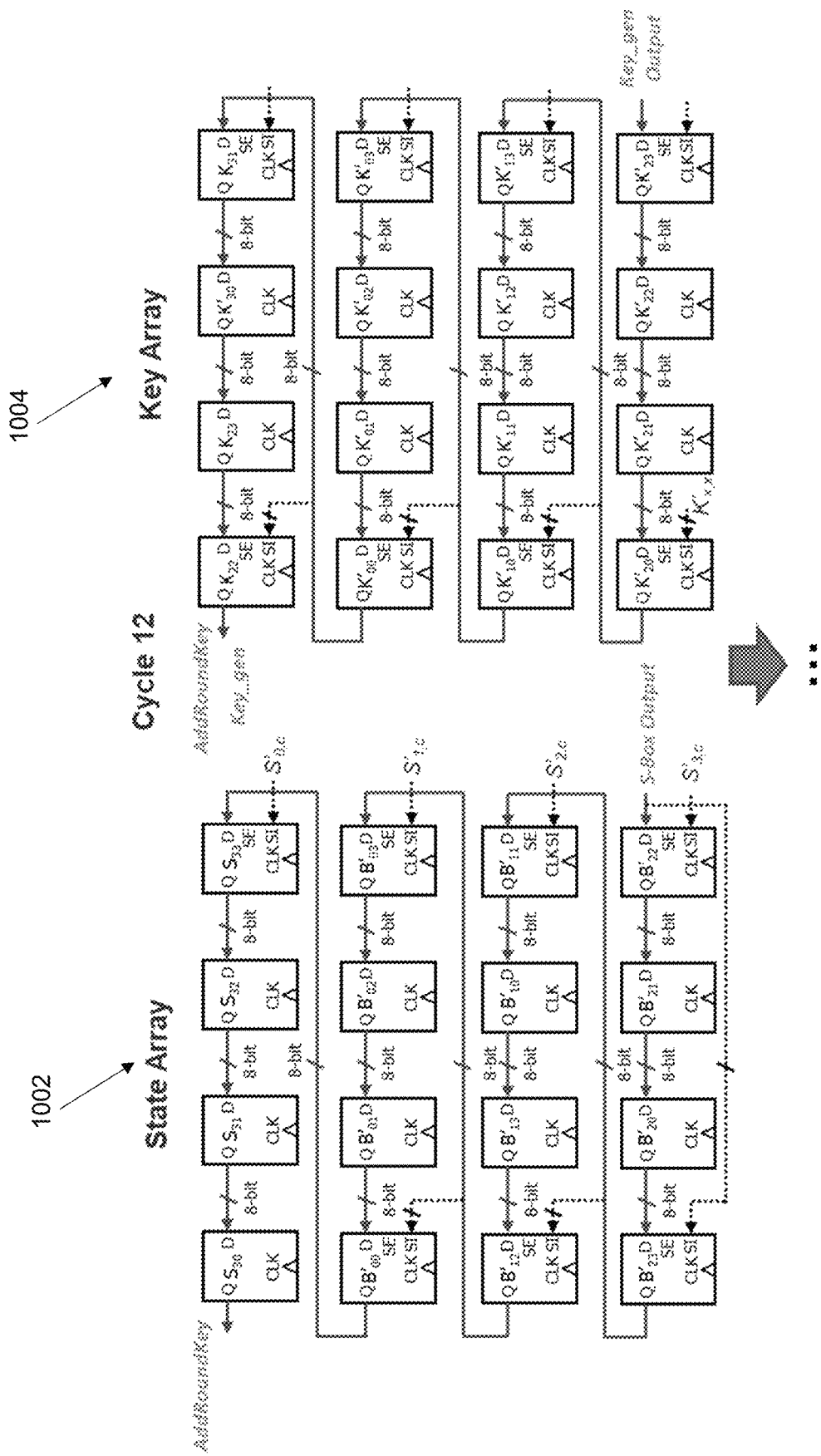
FIG. 12C is a schematic illustration of the dataflow of the AES device at cycle 12 in the exemplary embodiment.

FIG. 12C is a schematic illustration of the dataflow of the AES device at cycle 12 in the exemplary embodiment. Cycle 12 is shown after the clock gating at cycle 11 so that the portion or the continuation of the ShiftRows operation at cycle 11 may be better illustrated.

At cycle 12, the control signals $CLK_{G1}$ 1008 and $CLK_{G2}$ 1012 are removed and data flow within the state array 1002 is allowed to continue. The active data flow returns to as per the clock cycles before cycle 11, e.g. as per cycle 0. At this cycle, it is observed that the state data in the fourth to the first stages of the state array 1002 are $B'_{23}$, $B'_{20}$, $B'_{21}$, $B'_{22}$ respectively; and the state data in the eighth to the fifth stages of the state array 1002 are $B'_{12}$, $B'_{13}$, $B'_{10}$, $B'_{11}$ respectively. That is, the state data has been maintained in the third to first stages and in the seventh to fifth stages. The state data in the fourth stage has been shifted from S-Box Subbytes output, i.e. it is the next state data after $B'_{22}$. The state data of the fourth stage of cycle 11 has been shifted to the eighth stage due to the clock gating, i.e. the eighth stage contains $B'_{12}$.

The state data of the eighth stage of cycle 11 has been allowed to be shifted to the ninth stage, i.e. the ninth stage now contains $B'_{03}$. The rest of the stages from the ninth stage have been shifted accordingly as well.

The dataflow and operations continue with each clock cycle with the same active data flows until cycle 15.

Figure 13A:
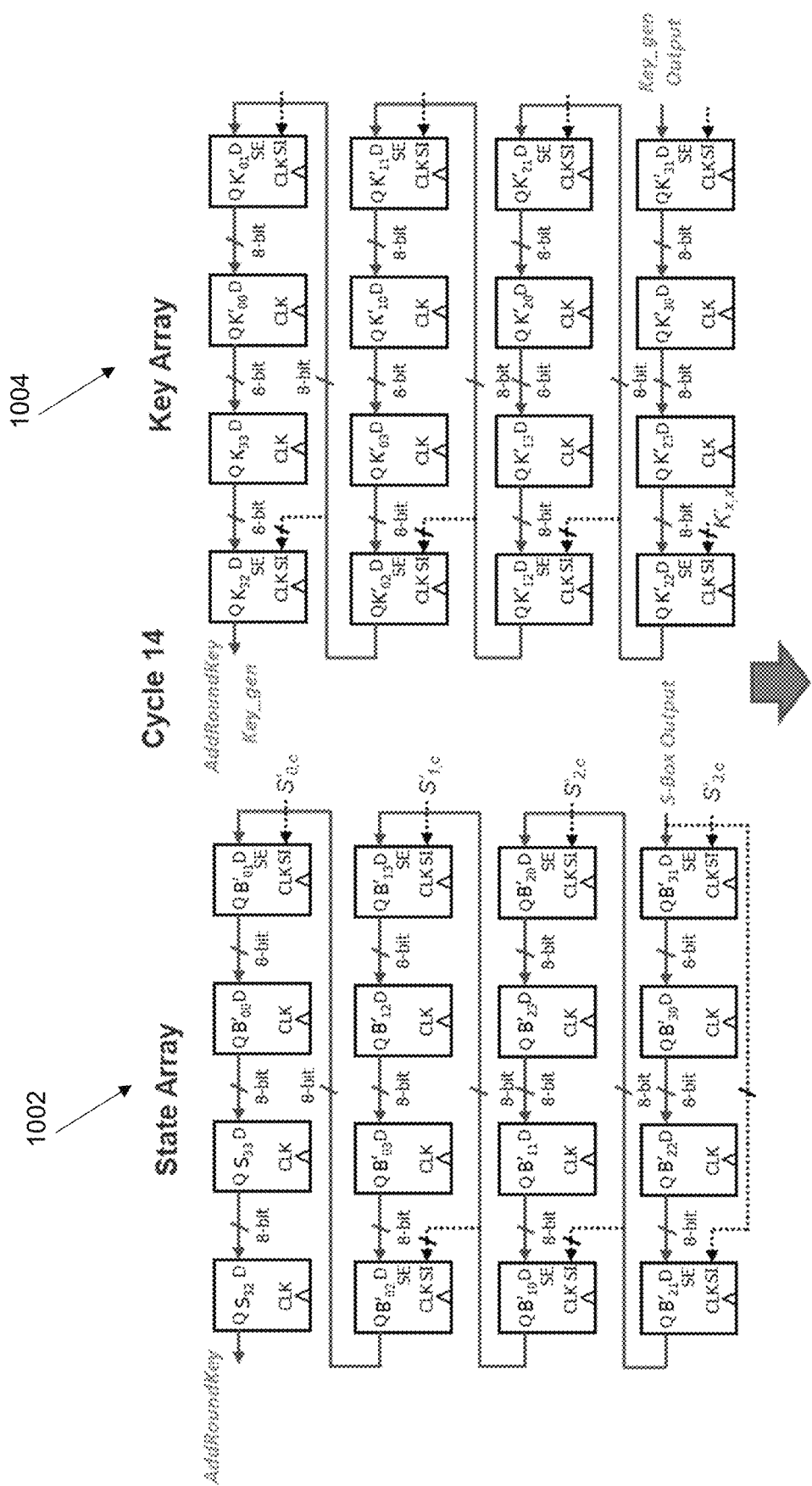
FIG. 13A is a schematic illustration of the dataflow of the AES device at cycle 14 in the exemplary embodiment.

FIG. 13A is a schematic illustration of the dataflow of the AES device at cycle 14 in the exemplary embodiment. Cycle 14 is first shown so that a portion or a continuation of the ShiftRows operation at cycle 15 may be better illustrated.

In FIG. 13A, at the state array 1002, the state data $B'_{22}$ (originally at the first stage at cycle 12) has now been shifted to the third stage. The state data originally at the sixteenth and fifteenth stages at cycle 12 have been Subbytes-transformed and have been shifted to the second and first stages at cycle 14, i.e. $B'_{30}$ and $B'_{31}$ respectively.

Figure 13B:
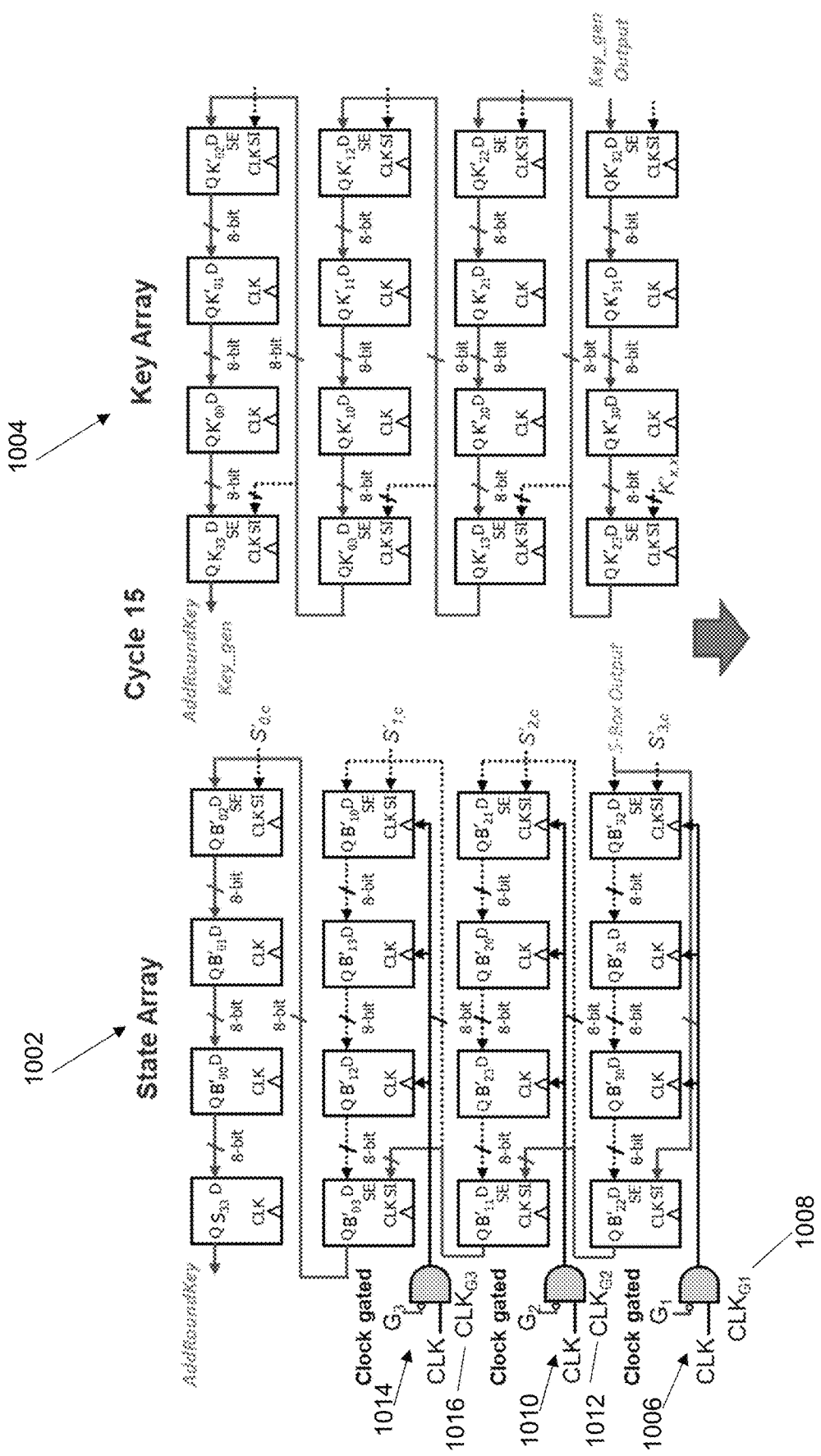
FIG. 13B is a schematic illustration of the dataflow of the AES device at cycle 15 in the exemplary embodiment.

FIG. 13B is a schematic illustration of the dataflow of the AES device at cycle 15 in the exemplary embodiment. At cycle 15, the ShiftRows controller commences clock gating as with cycles 7 and 11. Compare e.g. FIGS. 6A and 6B. For the key array 1004, the active data flows are not modified from the previous cycles.

At cycle 15, the active data flow of the second, third and last rows (or row 1, row 2 and row 3) of the state array 1002 is modified. The control block module implementing the ShiftRows controller (shown schematically as respective cells 1006, 1010, 1014) outputs the control signals $CLK_{G1}$ 1008, $CLK_{G2}$ 1012 and $CLK_{G3}$ 1016 respectively to instruct the first, second, third, fifth, sixth, seventh, ninth, tenth and eleventh stages of the state array 1002 to hold/prevent data movement. $CLK_{G1}$ 1008 affects the first, second and third stages, $CLK_{G2}$ 1012 affects the fifth, sixth and seventh stages while $CLK_{G3}$ 1016 affects the ninth, tenth and eleventh stages.

As such, there is no active data flow from the first to the fourth stages of the state array 1002, from the fifth to eighth stages of the state array 1002 and from the ninth to twelfth stages of the state array 1002.

At the fourth stage, using the additional input port (i.e. SI port) of the enabled scan flip-flop disposed at the fourth stage, the active data flow to this fourth stage is from a connection to the S-Box Subbytes output. At the eighth stage, using the additional input port (i.e. SI port) of the enabled scan flip-flop disposed at the eighth stage, the active data flow to this eighth stage is from a connection to the fourth stage. At the twelfth stage, using the additional input port (i.e. SI port) of the enabled scan flip-flop disposed at the twelfth stage, the active data flow to this twelfth stage is from a connection to the eighth stage.

At this cycle, it is observed that the state data in the fourth to the first stages of the state array 1002 are $B'_{22}$, $B'_{30}$, $B'_{31}$, $B'_{32}$ respectively. It is observed that the state data in the eighth to the fifth stages of the state array 1002 are $B'_{11}$, $B'_{23}$, $B'_{20}$, $B'_{21}$ respectively. It is observed that the state data in the twelfth to the ninth stages of the state array 1002 are $B'_{03}$, $B'_{12}$, $B'_{13}$, $B'_{10}$ respectively.

Figure 13C:
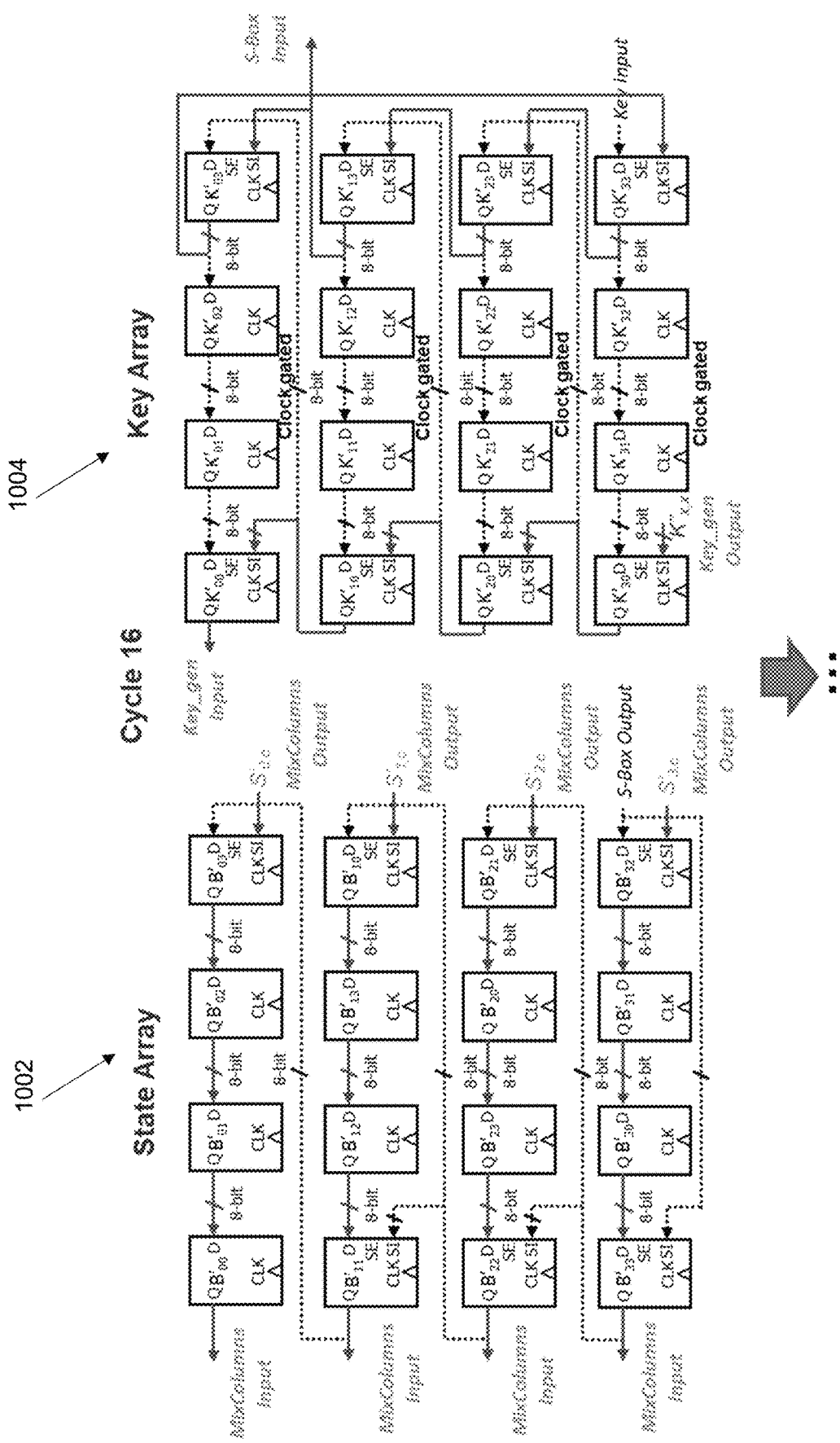
FIG. 13C is a schematic illustration of the dataflow of the AES device at cycle 16 in the exemplary embodiment.

FIG. 13C is a schematic illustration of the dataflow of the AES device at cycle 16 in the exemplary embodiment. Cycle 16 is shown after the clock gating at cycle 15 so that the completion of the ShiftRows operation after cycle 15 may be better illustrated.

In addition, cycle 16 also shows the commencement of the MixColumns operation for the state array 1002 and the commencement of the RotWord operation for the key array 1004.

At cycle 16, the control signals $CLK_{G1}$ 1008, CLKG2 1012 and CLKG3 1016 are removed and data flow within the state array 1002 is allowed to continue but in the manner described below for a MixColumns operation.

At cycle 16, it is observed that the state array 1002 contains the state data that has been aligned after completion of the ShiftRows operation, i.e. as compared to an expected alignment after a typical ShiftRows operation.

That is, the first row of the state array 1002 contains the aligned state data $B'_{00}$, $B'_{01}$, $B'_{02}$, $B'_{03}$, the second row of the state array 1002 contains the aligned state data $B'_{11}$, $B'_{12}$, $B'_{13}$, $B'_{10}$, the third row of the state array 1002 contains the aligned state data $B'_{22}$, $B'_{23}$, $B'_{20}$, $B'_{21}$ and the fourth row of the state array 1002 contains the aligned state data $B'_{33}$, $B'_{30}$, $B'_{31}$, $B'_{32}$.

With the ShiftRows operation completed, a MixColumns operation is commenced. For the state array 1002, the controllable data processing members of the fourth column (or right-most column) each have its additional input port connected to the one or more parallel processing members of the functional block of the AES device. Compare the MixColumns controller 334 of FIG. 3A of the control block that instructs the MixColumns processing, the MixColumns block 348 of FIG. 3A and FIG. 8B.

As can be observed at FIG. 13C, the first stage has its additional input port (i.e. SI port) connected to $S'_{3,c}$, the fifth stage has its additional input port connected to $S'_{2,c}$, the ninth stage has its additional input port connected to $S'_{1,c}$ and the thirteenth stage has its additional input port connected to $S'_{0,c}$. The notation c refers to the column numbering. The active data flow from cycle 16 onwards to cycle 20 (i.e. 4 cycles) is for the shift-in of the MixColumns output from the MixColumns block over 4 cycles via the additional input ports (i.e. SE ports) of the fourth column stages of the state array 1002. From the fourth column, the active data flow is from the output ports (Q ports) of the fourth column to the input ports (D ports) of the third column; from the output ports (Q ports) of the third column to the input ports (D ports) of the second column; the output ports (Q ports) of the second column to the input ports (D ports) of the first column. The output ports (Q ports) of the first column are connected to the input(s) of the MixColumns block. Compare FIG. 8B.

Therefore, when cycle 16 commences, the first column state data (in column format) $B'_{00}$, $B'_{11}$, $B'_{22}$, $B'_{33}$ are shifted by instruction from the MixColumns controller to the parallel MixColumns block. The output of the processing at the parallel MixColumns block is shifted into the fourth column.

Figure 13D:
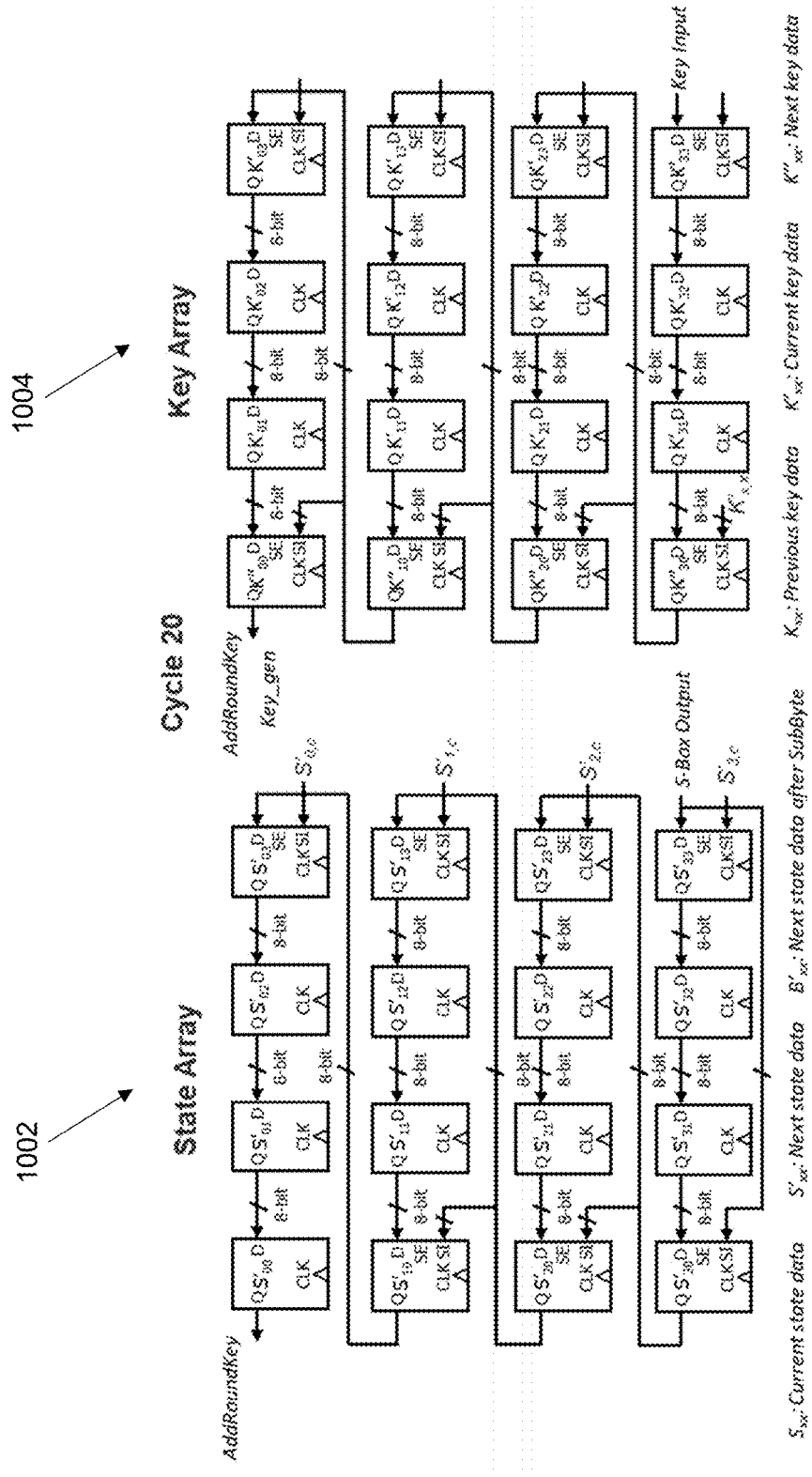
FIG. 13D is a schematic illustration of the state data and key data of the AES device at cycle 20 in the exemplary embodiment.

FIG. 13D is a schematic illustration of the state data and key data of the AES device at cycle 20 in the exemplary embodiment. Cycle 20 is the twenty-first (21st) cycle of one round of the AES procedure. At end of cycle 20, the state data and the key data are aligned for the next round of the AES procedure.

Referring to cycle 16 of FIG. 13C, over four cycles to cycle 20, for example, from the shifting from the first column at cycle 16, with c=0, the MixColumns outputs $S'_{3,0}$, $S'_{2,0}$, $S'_{1,0}$, $S'_{0,0}$ are shifted into the fourth column and progressively over four cycles to reside at the first column. Compare the first column of the state array 1002 in FIG. 13D. That is, the next state data (from cycle 0) of $S'_{00}$ to $S'_{33}$ are aligned in the respective stages and ready for the next round of the AES procedure.

Turning back to FIG. 13C, for cycle 16, for the key array 1004, the active data flow is modified from preceding cycles. From cycle 16 onwards, for the key array 1004, the active data flows are restricted to the first column and the fourth column of the key array 1004. The controllable data processing components of the second and third columns of the key array 1004 are clock-gated by the control block module, e.g. using a clock gating cell similar in operation to e.g. cell 1006, to hold data movement for 4 cycles until cycle 20.

The first column is instructed by the control block module for round keys generation while the fourth column is instructed by the control block module for RotWord operations. Compare the shared AddRoundKey and round keys generation block that comprises the AddRoundKey block 342 and the round keys generation block 344 of FIG. 3A. Compare also FIG. 9A.

For the first column, the active data flow is from a connection from an output of the shared AddRoundKey and round keys generation block to the additional input port (i.e. SI port) of the fourth stage; from the output port (Q port) of the fourth stage to the input port (D port) of the eighth stage; from the output port (Q port) of the eighth stage to the input port (D port) of the twelfth stage; from the output port (Q port) of the twelfth stage to the input port (D port) of the sixteenth stage and from the output port (Q port) of the sixteenth stage to an input port of the shared AddRoundKey and round keys generation block.

From cycle 16, the key data from the sixteenth stage or $K'_{00}$ is shifted to the round keys generation block 344 such that the next key data $K''_{00}$ is produced and shifted progressively over 4 cycles to reside in the sixteenth stage. Compare the first column of the key array 1004 in FIG. 13D. That is, the next key data (from cycle 0) of $K''_{00}$ to $K''_{33}$ are aligned in the respective stages (along the first column of the key array 1004) and ready for the next round of the AES procedure. Comparison may also be made to the first column of FIG. 10A.

Turning back to FIG. 13C and the key array 1004, for the fourth column, the active data flow is from the output port (Q port) of the ninth stage to an input of the shared S-Box block. Compare the S-Box controller 336 and the shared S-Box block 340 of FIG. 3A and FIG. 7.

Further, the output port (Q port) of the ninth stage is also connected to the additional input port (SI port) of the thirteenth stage; the output port (Q port) of the thirteenth stage is connected to the additional input port (SI port) of the first stage; the output port (Q port) of the first stage is connected to the additional input port (SI port) of the fifth stage and the output port (Q port) of the fifth stage is connected to the additional input port (SI port) of the ninth stage.

It is recalled that Rotword is a one byte circular left shift of a word. Thus, from cycle 16, over four cycles to cycle 20, the word that is shifted from the ninth stage is circular shifted, i.e. $K'_{13}$, $K'_{23}$, $K'_{33}$, $K'_{03}$. In addition, over the 4 cycles, the key data of the fourth column is cycled back to be aligned in fourth column. Compare the fourth column of the key array 1004 in FIGS. 13C and 13D.

At the end of cycle 20, with reference to FIG. 13D, both the state array 1002 and the key array 1004 are aligned for the next round of the AES procedure. At the end of the round, the state counter (compare the state counter 328 of FIG. 3A and FIG. 4C) and the Round constant Rcon generator & Round counter block (compare the Round constant Rcon generator & Round counter block 330 of FIG. 3A and FIG. 4B) operate to respectively indicate the end of a round and to generate a next round constant value and a round value.

In view of the above exemplary embodiment, the inventors recognize that with careful design of the data flow in the state array and the key array, it is possible to accomplish all data movement distributed in 21 clock cycles. In the above exemplary embodiment, the inventors recognize that only about 269 flip-flops are used. The design comprises 128-bits for the state array, 128-bits for the key array, 5-bits for the state counter, 8-bits for the round value and round constant generation module, and combinational logic gates for the remainder of the AES device. The inventors recognize that no Finite State Machine (FSM) is needed in the design and thus, chip area and power consumption can be minimized. In addition, internal control of the AES device is implemented by combinational logic. In the exemplary embodiment, the input value of the control logic is the value of state counter and round value from the round value and round constant generation module.

In contrast to conventional designs, the inventors recognize that there can be significant savings in terms of area, savings etc. over the current art. For example, in conventional design, it is recognized that typically, hundreds or even thousands of flip-flops are required to store state and key data, as well as control signals generated in each round of an AES procedure.

Table 1 below shows a comparison or benchmark of the above exemplary embodiment against the current art.

TABLE 1

Benchmark of exemplary embodiment with current art AES designs

| Parameter | Our design | JSSC'11 [4] | JSSC'15 [6] | SVLSI'19 Shan [7] | SVLSI'16 [8] | ISSCC'09 [9] | SVLSI'15 [10] |
|---|---|---|---|---|---|---|---|
| Technology (nm) | 40 | 45 | 22 | 28 | 40 | 130 | 65 |
| Area (um$^2$) | 1800 | 26000 | 2200 | 3090 | 4290 | 350000 | 97000 |
| Area Norm to 40 nm (um$^2$) | 1800 | 20543 | 7273 | 6306 | 4290 | 33136 | 36734 |
| Nominal Supply Votage (V) | 0.81 | 1.1 | 0.9 | 0.9 | 0.9 | 1.2 | 1 |
| Maximum Frequency (MHz) | 200 | 2100 | 1100 | 875 | 1300 | 220 | 1320 |
| Maximum Throughput (Gbps) | 0.113 | 26.5 | 0.432 | 0.991 | 0.49 | 2.56 | 16.9 |
| Power/Frequency (mW/MHz) | 0.373 | 62.5 | 13 | 3.86 | 4..39 | 33.32 | 138.1 |
| Energy Efficiency (Gbps/W) | 303.7 | 424.1 | 33 | 257 | 113 | 34.92 | 122.4 |
| Energy per bit (pJ/b) | 3.293 | 2.358 | 31 | 3.891 | 8.85 | 26.63 | 8.17 |
| Energy per bit Norm to 40 nm (pJ/b) | 3.293 | 1.863 | 102.5 | 7.941 | 8.85 | 2.7105 | 3.094 |

| Parameter | ISSCC'19 [11] | ISSCC'11 [12] | ISSCC'17 [13] | ASSCC'17 [14] | SVLSI'19 Kumar [15] |
|---|---|---|---|---|---|
| Technology (nm) | 130 | 130 | 130 | 65 | 14 |
| Area (um2) | 2000000 | 1886185 | 2000000 | 32000 | 4900 |
| Area Norm to 40 nm (um$^2$) | 189349 | 178572 | 189349 | 12118 | 40000 |
| Nominal Supply Votage (V) | 0.84 | 1.2 | 0.8 | 1 | 0.75 |
| Maximum Frequency (MHz) | 80 | 50 | 40 | 430 | 708 |
| Maximum Throughput (Gbps) | NA | | | 5.504 | 0.839 |
| Power/Frequency (mW/MHz) | 10.9 | | 10.5 | 11.8 | 11 |
| Energy Efficiency (Gbps/W) | | | | 487.3 | 76.27 |
| Energy per bit (pJ/b) | | | | 2.14 | 13.11 |
| Energy per bit Norm to 40 nm (pJ/b) | | | | 0.81 | 107 |

In Table 1, the columns after "Our Design" contain available data collated from current art. The citations for the columns in sequence are provided as follows:

[4] Mathew, S. K., Sheikh, F., Kounavis, M., Gueron, S., Agarwal, A., Hsu, S. K., Kaul, H., Anders, M. A. and Krishnamurthy, R. K., "53 Gbps Native GF(24)2 Composite-Field AES-Encrypt/Decrypt Accelerator for Content-Protection in 45 nm High-Performance Microprocessors". IEEE J. Solid-State Circuits, vol. 46, no. 4, pp. 767-776, April 2011.

[6] Mathew, S., Satpathy, S., Suresh, V., Anders, M., Kaul, H., Agarwal, A., Hsu, S., Chen, G. and Krishnamurthy, R., "340 mv-1.1 v, 289 gbps/w, 2090-gate nanoaes hardware accelerator with area-optimized encrypt/decrypt gf (24)2 polynomials in 22 nm tri-gate cmos". IEEE J. Solid-State Circuits, vol. 50, no. 4, pp. 1048-1058 April 2015.

[7] Shan, W., Fan, A., Xu, J., Yang, J. and Seok, M., "A 923 Gbps/W, 113-Cycle, 2-Sbox Energy-efficient AES Accelerator in 28 nm CMOS". Proc. IEEE Symp. VLSI Circuits, pp. June 2019.

[8] Zhang, Y., Yang, K., Saligane, M., Blaauw, D. and Sylvester, D., "A compact 446 Gbps/W AES accelerator for mobile SoC and IoT in 40 nm". Proc. IEEE Symp. VLSI Circuits, pp. 1-2, June 2016.

[9] Tokunaga, C. and Blaauw, D., "Secure AES engine with a local switched-capacitor current equalizer". Proc. IEEE Int. Solid-State Circuits Conf., pp. 64-65, February 2009.

[10] Lu, S., Zhang, Z. and Papaefthymiou, M., "1.32 GHZ high-throughput charge-recovery AES core with resistance to DPA attacks". Proc. IEEE Symp. VLSI Circuits, pp. C246-C247, June 2015.

[11] A. Singh, M. Kar, S. Mathew, A. Rajan, V. De and S. Mukhopadhyay, "A 128b AES engine with higher resistance to power and electromagnetic side-channel attacks enabled by a security-aware integrated all-digital low-dropout regulator". Proc. IEEE Int. Solid-State Circuits Conf., pp. 404-406, February 2019.

[12] Doulcier-Verdier, M., Dutertre, J. M., Fournier, J., Rigaud, J. B., Robisson, B. and Tria, A., "A side-channel and fault-attack resistant AES circuit working on duplicated complemented values". Proc. IEEE Int. Solid-State Circuits Conf., pp. 274-276, February 2011.

[13] Kar, M., Singh, A., Mathew, S., Rajan, A., De, V. and Mukhopadhyay, S., "Improved power-side-channel-attack resistance of an AES-128 core via a security-aware integrated buck voltage regulator". Proc. IEEE Int. Solid-State Circuits Conf., pp. 142-143. February 2017.

[14] S. Lu, Z. Zhang and M. Papaefthymiou, "A 1.25 pJ/bit 0.048 mm2 AES core with DPA resistance for IoT devices", IEEE Asian Solid-State Circuits Conf. (A-SSCC), pp. 65-68, November 2017.

[15] Kumar, R., Suresh, V., Kar, M., Satpathy, S., Anders, M., Kaul, H., Agarwal, A., Hsu, S., Chen, G., Krishnamurthy, R. and De, V., "A 4900um2 839 Mbps Side-Channel Attack Resistant AES-128 in 14 nm CMOS with Heterogeneous Sboxes, Linear Masked MixColumns and Dual-Rail Key Addition". Proc. IEEE Symp. VLSI Circuits, pp. C234-C235, June 2019.

Based on the comparison result, it can be observed that the exemplary embodiment above has the smallest area of about 1800 um$^2$. See second and third rows. In terms of absolute area, in comparison to the next smallest area as shown in the current art, i.e. JSSC'15 at citation [6], it is observed that the area used by the above exemplary embodiment is about 20% less than JSSC'15 which uses a 22 nm chip and incurs an area of 2200 um$^2$. When normalized to a 40 nm technology comparison, in comparison to SVLSI'16 at citation [8], the area used by the above exemplary embodiment is about 60% less than the citation [8] 40 nm chip which incurs an area of 4290 um$^2$.

In addition, the energy efficiency 3.293 pJ/b in around 0.81V is within the same range as previous designs that ranged from 2.14 pJ/b to 38.1 pJ/b. See rows 10 and 11. Moreover, the estimated energy efficiency under ultra-low-power 0.4V is 0.803 pJ/b, which is lower than other prior designs by the inventors, and obtained during chip testing. The value is comparable to and/or lower than a number of entries in Table 1.

As such, the inventors recognize that the compact and energy-efficient features of the exemplary embodiment indicate that the exemplary embodiment is suitable for, for example, area and power-constrained IoT applications.

Figure 14:
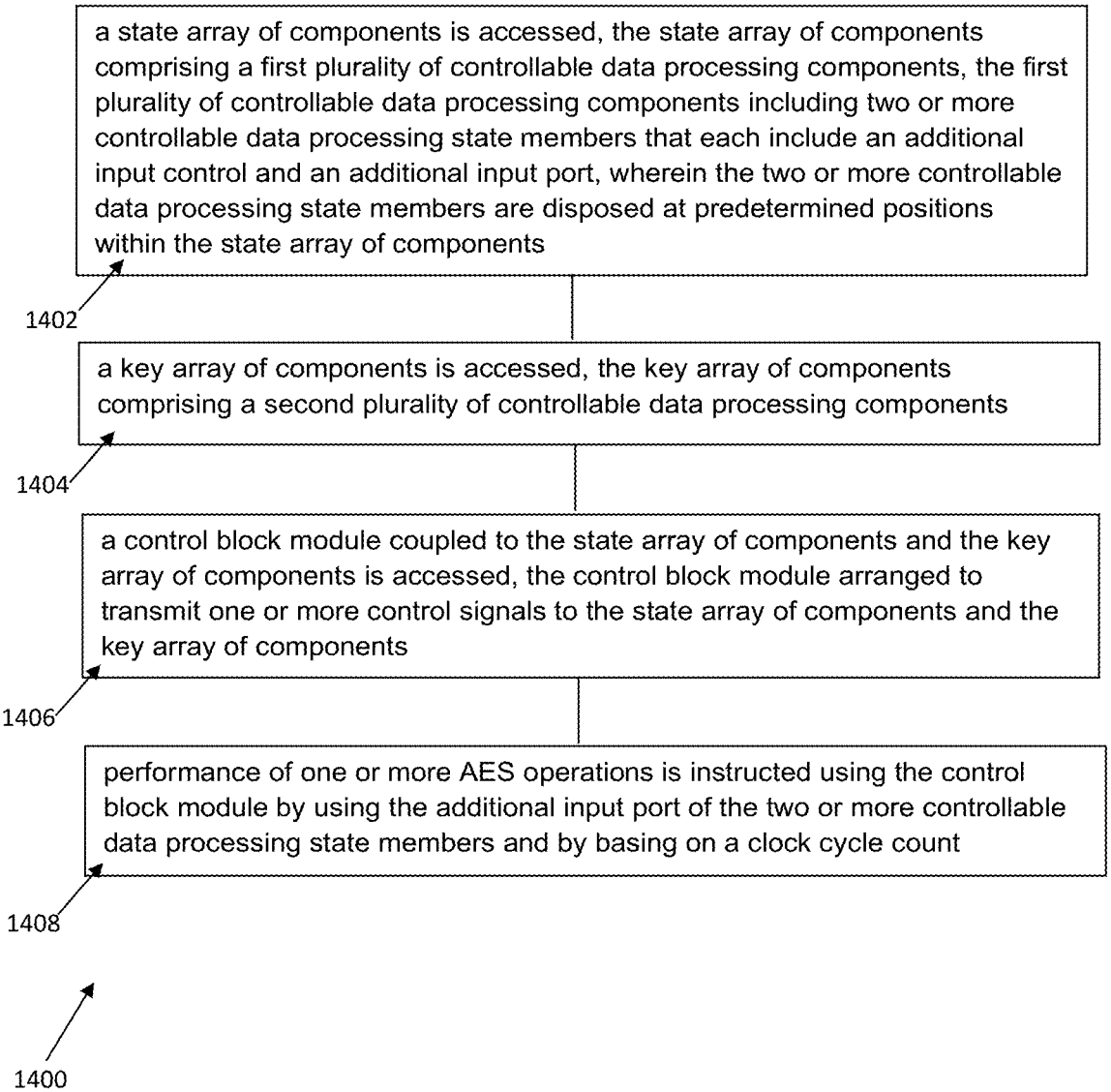
FIG. 14 is a schematic flowchart for illustrating a method of performing an AES operation in an exemplary embodiment.

FIG. 14 is a schematic flowchart 1400 for illustrating a method of performing an AES operation in an exemplary embodiment. The method may be computer-implemented. At step 1402, a state array of components is accessed, the state array of components comprising a first plurality of controllable data processing components, the first plurality of controllable data processing components including two or more controllable data processing state members that each include an additional input control and an additional input port, wherein the two or more controllable data processing state members are disposed at predetermined positions within the state array of components. At step 1404, a key array of components is accessed, the key array of components comprising a second plurality of controllable data processing components. At step 1406, a control block module coupled to the state array of components and the key array of components is accessed, the control block module arranged to transmit one or more control signals to the state array of components and the key array of components. At step 1408, performance of one or more AES operations is instructed using the control block module by using the additional input port of the two or more controllable data processing state members and by basing on a clock cycle count.

The method may further comprise accessing the second plurality of controllable data processing components including two or more controllable data processing key members that each include an additional input control and an additional input port, wherein the two or more controllable data processing key members are disposed at predetermined positions within the key array of components; and instructing performance of the one or more AES operations using the control block module by using the additional input port of the two or more controllable data processing key members and by basing on the clock cycle count.

The step of instructing performance of the one or more AES operations using the control block module may further comprise instructing performance of the one or more AES operations by basing on a distribution over a plurality of predetermined clock cycles.

The step of instructing performance of the one or more AES operations using the control block module may further comprise transmitting the one or more control signals to the state array of components to hold one or more data movement within the state array of components.

The method may further comprise accessing a state counter, the state counter being based on a predetermined number of clock cycles to indicate completion of a round of an AES procedure; and using the control block module to instruct a data output component to output a round constant value based on an indication of a commencement of a round. In some exemplary implementations, the indication of a commencement of a round may be provided by the state counter.

The method may further comprise accessing a functional block module, the functional block module being coupled to the state array of components and the key array of components, the functional block module also coupled to the control block module; and wherein the functional block module comprises a single substitution box (S-Box) of predetermined values, the single S-Box being accessible to both the state array of components and the key array of components.

The functional block module may further comprise one or more parallel processing members that is each arranged to obtain as an input a plurality of inputs simultaneously in the form of a column from the state array of components, and the method may further comprise using the control block module to instruct the one or more parallel processing members to process the plurality of inputs and to output a MixColumns value that is indicative of a row value for the state array of components.

The functional block module may further comprise a shared circuitry that is accessible to the state array of components and the key array of components, and the method may further comprise using the control block module to instruct the shared circuitry to output a round key to the key array of components or an input data to the state array of components.

For an AES-128 procedure, the state array of components may be ordered in a 4×4 array and the controllable data processing state members may be disposed at least in the first, fourth, fifth, eighth, ninth, twelfth and thirteenth positions of the 4×4 array; wherein the first position is the bottom-right-most position of the array and the array having each position being serially coupled to a next position.

The step of instructing performance of the one or more AES operations using the control block module may further comprise instructing performance of the one or more AES operations distributed over three different predetermined clock cycles.

In some exemplary embodiments, for an AES-128 procedure, the key array of components is ordered in a 4×4 array and the controllable data processing key members may be disposed at least in the first, fourth, fifth, eighth, ninth, twelfth, thirteenth and sixteenth positions of the 4×4 array; wherein the first position is the bottom-right-most position of the array and the array having each position being serially coupled to a next position.

In another exemplary embodiment, there may be provided a non-transitory tangible computer readable storage medium having stored thereon software instructions that, when executed by a computer processor of an AES device, cause the computer processor to perform a computer-implemented method of performing an AES operation, by executing the steps as described above, e.g. with reference to FIG. 14.

In the described exemplary embodiments, AES operations such as ShiftRows, MixColumns, SubWord etc. are performed in a round of an AES procedure. The control block module can instruct performance of one or more AES operations via usage of the additional input port of the two or more controllable data processing state members based on a clock cycle count. Further, the control block module can instruct the performance of the one or more AES operations based on a distribution over a plurality of predetermined clock cycles. The performance of the one or more AES operations may be over consecutive clock cycles (such as over four consecutive clock cycles for MixColumns) and/or over non-consecutive clock cycles (such as over three non-consecutive clock cycles for ShiftRows). In one round of the AES procedure, the one or more AES operations may be performed over both consecutive clock cycles and non-consecutive clock cycles.

The described exemplary embodiments may provide a compact and low-power AES hardware accelerator. The described exemplary embodiments may provide an AES device that in turn provides a compact and low-power hardware implementation of AES-128. There can be provided an efficient implementation of a lightweight cryptographic algorithm.

The inventors have been able to provide repeatable functionality and results of the exemplary embodiments in a number of tests. Repeatability can be established consistently. A number of tests performed by the inventors have proven that the AES encryption functions can be performed consistently with the same parameters/settings. Further, the inventors recognize that the hardware implementation of the exemplary embodiments can be repeated on different platforms using the same logic on the components.

The inventors recognize that the exemplary embodiments can be implemented on Field Programmable Gate Arrays (FPGAs) such as tested on the Xilinx KC705 development board. The inventors recognize that the exemplary embodiments can be implemented on CMOS processes such as, as designed, on UMC's 40 nm ultra-low-power (ULP) technology node.

The above exemplary embodiments may be usefully applicable to edge computing devices with hardware security requirements. For example, the exemplary embodiments may be used in applications that may include, but are not limited to, audio and video device encryption, IoT edge hardware security, self-encrypting disk and database encryption etc. The exemplary embodiments may also be useful for IoT SoC (system on a chip) implementations. The exemplary embodiments may provide on-device hardware security and can be used in low-cost, low power edge devices. The inventors also recognize that it may be possible to provide integration of open source CPUs on heterogeneous systems as well as further reduce the area of the AES hardware accelerator by employing other optimization strategies, such as usage of multi-bit cells.

In the description, the terms "input" and "output" may be used interchangeably with terms such as "input signals" and "output signals", where the context is regarding describing signals being sent into an input port or being transmitted from an output port.

In the description, the controllable data processing components and members are described as being in the form of, for example, D flip-flops and scan flip-flops. However, it will be appreciated that the exemplary embodiments are not limited as such. That is, the D flip flops may be replaced by other forms of data movement components. The scan flip-flops may be replaced by other components that can provide a multiplexer selection of at least two input ports and be controllable at a control port (or enable) to make such a multiplexer selection.

In the exemplary embodiments, it will be appreciated that the arrays, i.e. the state array and the key array, are not limited to be provided or disposed as regular matrices. That is, an array is understood to be an ordered arrangement. Thus, the state array of components and the key array of components may have the components disposed in any way or irregular lengths etc., but with the sequence or coupling or serial coupling in an ordered manner.

In the exemplary embodiments, it will be appreciated that the controllable data processing components and members are provided within the respective arrays themselves and function to process data (or hold data movement as the case may be) within the respective arrays. That is, these controllable data processing components and members are not disposed external to the arrays for performing other data holding functions etc. As such, it can be recognised that such displacement within the arrays can significantly save space, cost and power for the final compact AES device.

The terms "coupled" or "connected" as used in this description are intended to cover both directly connected or connected through one or more intermediate means, unless otherwise stated.

The term "and/or", e.g., "X and/or Y" is understood to mean either "X and Y" or "X or Y" and should be taken to provide explicit support for both meanings or for either meaning.

The terms "associated with", "related to" and the like used herein when referring to two elements refers to a broad relationship between the two elements. The relationship includes, but is not limited to, a physical, a chemical or a biological relationship. For example, when element A is associated with element B, elements A and B may be directly or indirectly attached to each other or element A may contain element B or vice versa.

The terms "exemplary embodiment", "example embodiment", "exemplary implementation", "exemplarily" and the like used herein are intended to indicate an example of matters described in the present disclosure. Such an example may relate to one or more features defined in the claims and is not necessarily intended to emphasise a best example or any essentialness of any features.

The description herein may be, in certain portions, explicitly or implicitly described as algorithms and/or functional operations that operate on data within a computer memory or an electronic circuit. These algorithmic descriptions and/or functional operations are usually used by those skilled in the information/data processing arts for efficient description. An algorithm is generally relating to a self-consistent sequence of steps leading to a desired result. The algorithmic steps can include physical manipulations of physical quantities, such as electrical, magnetic or optical signals capable of being stored, transmitted, transferred, combined, compared, and otherwise manipulated.

Further, unless specifically stated otherwise, and would ordinarily be apparent from the following, a person skilled in the art will appreciate that throughout the present specification, discussions utilizing terms such as "scanning", "calculating", "determining", "replacing", "generating", "initializing", "outputting", and the like, refer to action and processes of an instructing processor/computer system, or similar electronic circuit/device/component, that manipulates/processes and transforms data represented as physical quantities within the described system into other data similarly represented as physical quantities within the system or other information storage, transmission or display devices etc.

The description also discloses relevant device/apparatus for performing the steps of the described methods. Such apparatus may be specifically constructed for the purposes of the methods, or may comprise a general purpose computer/processor or other device selectively activated or reconfigured by a computer program stored in a storage member. The algorithms and displays described herein are not inherently related to any particular computer or other apparatus. It is understood that general purpose devices/machines may be used in accordance with the teachings herein. Alternatively, the construction of a specialized device/apparatus to perform the method steps may be desired.

In addition, it is submitted that the description also implicitly covers a computer program, in that it would be clear that the steps of the methods described herein may be put into effect by computer code. It will be appreciated that a large variety of programming languages and coding can be used to implement the teachings of the description herein. Moreover, the computer program if applicable is not limited to any particular control flow and can use different control flows without departing from the scope of the invention.

Furthermore, one or more of the steps of the computer program if applicable may be performed in parallel and/or sequentially. Such a computer program if applicable may be stored on any computer readable medium. The computer readable medium may include storage devices such as magnetic or optical disks, memory chips, or other storage devices suitable for interfacing with a suitable reader/general purpose computer. In such instances, the computer readable storage medium is non-transitory. Such storage medium also covers all computer-readable media e.g. medium that stores data only for short periods of time and/or only in the presence of power, such as register memory, processor cache and Random Access Memory (RAM) and the like. The computer readable medium may even include a wired medium such as exemplified in the Internet system, or wireless medium such as exemplified in Bluetooth technology. The computer program when loaded and executed on a suitable reader effectively results in an apparatus that can implement the steps of the described methods.

The exemplary embodiments may also be implemented as hardware modules. A module is a functional hardware unit designed for use with other components or modules. For example, a module may be implemented using digital or discrete electronic components, or it can form a portion of an entire electronic circuit such as an Application Specific Integrated Circuit (ASIC). A person skilled in the art will understand that the exemplary embodiments can also be implemented as a combination of hardware and software modules.

Additionally, when describing some embodiments, the disclosure may have disclosed a method and/or process as a particular sequence of steps. However, unless otherwise required, it will be appreciated the method or process should not be limited to the particular sequence of steps disclosed. Other sequences of steps may be possible. The particular order of the steps disclosed herein should not be construed as undue limitations. Unless otherwise required, a method and/or process disclosed herein should not be limited to the steps being carried out in the order written. The sequence of steps may be varied and still remain within the scope of the disclosure.

Further, in the description herein, the word "substantially" whenever used is understood to include, but not restricted to, "entirely" or "completely" and the like. In addition, terms such as "comprising", "comprise", and the like whenever used, are intended to be non-restricting descriptive language in that they broadly include elements/components recited after such terms, in addition to other components not explicitly recited. For an example, when "comprising" is used, reference to a "one" feature is also intended to be a reference to "at least one" of that feature. Terms such as "consisting", "consist", and the like, may, in the appropriate context, be considered as a subset of terms such as "comprising", "comprise", and the like. Therefore, in embodiments disclosed herein using the terms such as "comprising", "comprise", and the like, it will be appreciated that these embodiments provide teaching for corresponding embodiments using terms such as "consisting", "consist", and the like. Further, terms such as "about", "approximately" and the like whenever used, typically means a reasonable variation, for example a variation of +/−5% of the disclosed value, or a variance of 4% of the disclosed value, or a variance of 3% of the disclosed value, a variance of 2% of the disclosed value or a variance of 1% of the disclosed value.

It will be appreciated by a person skilled in the art that other variations and/or modifications may be made to the specific embodiments without departing from the scope of the invention as broadly described. For example, in the description herein, features of different exemplary embodiments may be mixed, combined, interchanged, incorporated, adopted, modified, included etc. or the like across different exemplary embodiments. For example, exemplary embodiments are not necessarily mutually exclusive as some may be combined with one or more embodiments to form new exemplary embodiments. Furthermore, it will be appreciated that while the present disclosure provides embodiments having one or more of the features/characteristics discussed herein, one or more of these features/characteristics may also be disclaimed in other alternative embodiments and the present disclosure provides support for such disclaimers and these associated alternative embodiments. The present embodiments are, therefore, to be considered in all respects to be illustrative and not restrictive.

The invention claimed is:

1. An Advanced Encryption Standard (AES) device, the AES device comprising,
   a computer processor;
   a state array of components comprising a first plurality of controllable data processing components, the first plurality of controllable data processing components including two or more controllable data processing state members that each include an additional input control and an additional input port;
   a key array of components comprising a second plurality of controllable data processing components, the second plurality of controllable data processing components including two or more controllable data processing key members that each include an additional input control and an additional input port;
   a control block module comprising the computer processor to implement one or more AES operations, the control block module being coupled to the state array of components and the key array of components, the control block module arranged to transmit one or more control signals to the state array of components and the key array of components;
   wherein the two or more controllable data processing state members are disposed at predetermined positions within the state array of components;
   wherein the two or more controllable data processing key members are disposed at predetermined positions within the key array of components;
   wherein the control block module is arranged to instruct the performance of the one or more AES operations via usage of the additional input port of at least one of the two or more controllable data processing state members based on a clock cycle count;
   wherein the control block module is arranged to instruct the performance of the one or more AES operations via usage of the additional input port of at least one of the two or more controllable data processing key members based on the clock cycle count;
   wherein the control block module is arranged to instruct the performance of the one or more AES operations based on a distribution over a plurality of predetermined clock cycles:
   wherein the control block module being is arranged to transmit the one or more control signals to the state array of components to hold one or more data movement within the state array of components;
   wherein the control block module comprises a clock generation block that in turn comprises one or more clock gating cells and a state array shift data control block;
      wherein the clock generation block is arranged to provide row-based clocking scheduling for data to be shifted into the state array of components for an AES ShiftRows operation;
      wherein the one or more clock gating cells is arranged to perform the hold of the one or more data movement within the state array of components;
      wherein the shift data control block is arranged to provide a multiplexer selection with the two or more controllable data processing state members to perform the ShiftRows operation in the plurality of predetermined clock cycles; and
      wherein at least one on the first plurality of controllable data processing components is arranged to be clock gated by the one or more clock gating cells to hold one or more data movement within the state array of components.

2. The AES device as claimed in claim 1, wherein the control block module comprises,
   a state counter, the state counter being based on a predetermined number of clock cycles to indicate completion of a round of an AES procedure; and
   a data output component, the data output component arranged to output a round constant value based on an indication of a commencement of a round.

3. The AES device as claimed in claim 1, further comprising,
   a functional block module, the functional block module being coupled to the state array of components and the key array of components, the functional block module also coupled to the control block module; and
   wherein the functional block module comprises a single substitution box (S-Box) of predetermined values, the single S-Box being accessible to both the state array of components and the key array of components.

4. The AES device as claimed in claim 3, wherein the functional block module further comprises one or more parallel processing members that is each arranged to obtain as an input a plurality of inputs simultaneously in the form of a column from the state array of components, the one or more parallel processing members being further arranged to process the plurality of inputs and to output a MixColumns value that is indicative of a row value for the state array of components.

5. The AES device as claimed in claim 3, wherein the functional block module further comprises a shared circuitry that is accessible to the state array of components and the key array of components, the shared circuitry being arranged to output a round key to the key array of components or an input data to the state array of components.

6. The AES device as claimed in claim 1, wherein for an AES-128 procedure, the state array of components is ordered in a 4×4 array and the controllable data processing state members are disposed at least in the first, fourth, fifth, eighth, ninth, twelfth and thirteenth positions of the 4×4 array; further wherein the first position is the bottom-right-most position of the array and the array having each position being serially coupled to a next position.

7. The AES device as claimed in claim 1, wherein the performance of the one or more AES operations is distributed over three different predetermined clock cycles.

8. A computer-implemented method of performing an AES operation, the computer-implemented method comprising,
   accessing a state array of components comprising a first plurality of controllable data processing components, the first plurality of controllable data processing components including two or more controllable data processing state members that each include an additional input control and an additional input port, wherein the two or more controllable data processing state members are disposed at predetermined positions within the state array of components;

accessing a key array of components comprising a second plurality of controllable data processing components, the second plurality of controllable data processing components including two or more controllable data processing key members that each include an additional input control and an additional input port, wherein the two or more controllable data processing key members are disposed at predetermined positions within the key array of components;

accessing a control block module that comprises a computer processor, the control block module being coupled to the state array of components and the key array of components, the control block module arranged to transmit one or more control signals to the state array of components and the key array of components;

instructing performance of one or more AES operations using the control block module by using the additional input port of at least one of the two or more controllable data processing state members and by basing on a clock cycle count and by using the additional input port of at least one of the two or more controllable data processing key members and by basing on the clock cycle count, and further instructing the performance of the one or more AES operations by basing on a distribution over a plurality of predetermined clock cycles;

further wherein the step of instructing performance of the one or more AES operations using the control block module further comprises transmitting the one or more control signals to the state array of components to hold one or more data movement within the state array of components; the step further comprising providing row-based clocking scheduling for data to be shifted into the state array of components for an AES ShiftRows operation using a clock generation block of the control module;

performing the hold of the one or more data movement within the state array of components using one or more clock gating cells of the clock generation block wherein at least one of the first plurality of controllable data processing components is arranged to be clock gated by the one or more clock gating cells to hold one or more data movement within the state array of components; and providing a multiplexer selection with the two or more controllable data processing state members to perform the ShiftRows operation in the plurality of predetermined clock cycles using a shift data control block of the clock generation block.

9. The computer-implemented method as claimed in claim 8, further comprising accessing a state counter, the state counter being based on a predetermined number of clock cycles to indicate completion of a round of an AES procedure; and using the control block module to instruct a data output component to output a round constant value based on an indication of a commencement of a round.

10. The computer-implemented method as claimed in claim 8, further comprising accessing a functional block module, the functional block module being coupled to the state array of components and the key array of components, the functional block module also coupled to the control block module; and wherein the functional block module comprises a single substitution box (S-Box) of predetermined values, the single S-Box being accessible to both the state array of components and the key array of components.

11. The computer-implemented method as claimed in claim 10, wherein the functional block module further comprises one or more parallel processing members that is each arranged to obtain as an input a plurality of inputs simultaneously in the form of a column from the state array of components, and the method further comprises, using the control block module to instruct the one or more parallel processing members to process the plurality of inputs and to output a MixColumns value that is indicative of a row value for the state array of components.

12. The computer-implemented method as claimed in claim 10, wherein the functional block module further comprises a shared circuitry that is accessible to the state array of components and the key array of components, and the method further comprises, using the control block module to instruct the shared circuitry to output a round key to the key array of components or an input data to the state array of components.

13. The computer-implemented method as claimed in claim 8, wherein for an AES-128 procedure, the state array of components is ordered in a 4×4 array and the controllable data processing state members are disposed at least in the first, fourth, fifth, eighth, ninth, twelfth and thirteenth positions of the 4×4 array; further wherein the first position is the bottom-right-most position of the array and the array having each position being serially coupled to a next position.

14. The computer-implemented method as claimed in claim 8, wherein the step of instructing performance of the one or more AES operations using the control block module further comprises instructing performance of the one or more AES operations distributed over three different predetermined clock cycles.

* * * * *